(12) United States Patent
Nakajima

(10) Patent No.: US 8,216,105 B2
(45) Date of Patent: Jul. 10, 2012

(54) DIFFERENTIAL APPARATUS FOR VEHICLE AND ASSEMBLING METHOD THEREOF

(75) Inventor: Shinichiro Nakajima, Niiza (JP)

(73) Assignee: JTEKT Corporation, Osaka-shi (JP)

( * ) Notice: Subject to any disclaimer, the term of this patent is extended or adjusted under 35 U.S.C. 154(b) by 831 days.

(21) Appl. No.: 12/262,688

(22) Filed: Oct. 31, 2008

(65) Prior Publication Data

US 2009/0118054 A1 May 7, 2009

(30) Foreign Application Priority Data

| Nov. 2, 2007 | (JP) | 2007-286639 |
| Nov. 2, 2007 | (JP) | 2007-286640 |
| Nov. 2, 2007 | (JP) | 2007-286641 |
| Jan. 22, 2008 | (JP) | 2008-011590 |

(51) Int. Cl.
*F16H 48/06* (2006.01)
(52) U.S. Cl. ...................................... 475/230
(58) Field of Classification Search ............... 475/230
See application file for complete search history.

(56) References Cited

U.S. PATENT DOCUMENTS

| 1,445,865 | A | * | 2/1923 | Alden | 475/246 |
| 2,818,129 | A | * | 12/1957 | De Vere Harnett | 180/339 |
| 3,470,768 | A | * | 10/1969 | Percifield et al. | 475/230 |
| 4,305,313 | A | * | 12/1981 | Konkle | 475/240 |
| 5,980,417 | A | | 11/1999 | Wopshall, Jr. | |
| 6,461,267 | B1 | * | 10/2002 | Paielli | 475/150 |
| 6,699,154 | B2 | * | 3/2004 | Orr et al. | 475/230 |
| 7,306,537 | B2 | * | 12/2007 | Nakajima | 475/230 |
| 2004/0166985 | A1 | | 8/2004 | Sudou | |
| 2006/0287156 | A1 | * | 12/2006 | Nakajima | 475/230 |
| 2007/0095167 | A1 | | 5/2007 | Nakajima | |
| 2008/0004151 | A1 | | 1/2008 | Nakajima | |
| 2008/0051244 | A1 | | 2/2008 | Nakajima | |
| 2008/0194373 | A1 | | 8/2008 | Suzuki | |
| 2008/0227583 | A1 | | 9/2008 | Nakajima | |

FOREIGN PATENT DOCUMENTS

| EP | 1 734 288 A2 | 12/2006 |
| JP | 47-000924 | 1/1972 |
| JP | 57-090948 | 6/1982 |
| JP | 4-132245 | 12/1992 |
| JP | 7-34248 | 6/1995 |
| JP | 11-2311 | 1/1999 |
| JP | 2007-113747 | 5/2007 |

OTHER PUBLICATIONS

U.S. Appl. No. 12/534,399, filed Aug. 3, 2009, Nakajima, et al.
Japanese Office Action mailed Feb. 14, 2012 for JP Application No. 2007-286639 (with English translation). Japanese Office Action mailed Feb. 21, 2012 for JP Application No. 2007-286640 (with English translation).
Japanese Office Action mailed Feb. 21, 2012 for JP Application No. 2007-286641 (with English translation).
Japanese Office Action dated May 8, 2012 for JP Application 2007-286639 (w/English Translation), 4 pages.
Japanese Office Action dated May 8, 2012 for JP Application 2008-011590 (w/English Translation), 6 pages.
Japanese Office Action dated May 15, 2012 for Japanese Application No. 2007-286641 (w/English Translation).

* cited by examiner

*Primary Examiner* — Ha D. Ho
(74) *Attorney, Agent, or Firm* — Oblon, Spivak, McClelland, Maier & Neustadt, L.L.P.

(57) ABSTRACT

A differential apparatus for a vehicle includes pinion gear supporting portions 10, 11 rotatably supporting pinion gears 3, 4 by an outer surface of each of the gear collar portions 3B, 4B sliding thereon. Gear portions of the pinion gears 3, 4, having portions with the side gears 5R, 5L, are not included in the supported portion supported by the differential case 2 and are positioned nearer to the rotational axis of the differential case 2 than the gear collar portions 3B, 4B.

24 Claims, 16 Drawing Sheets

DIAMETER OF GEAR COLLAR PORTION

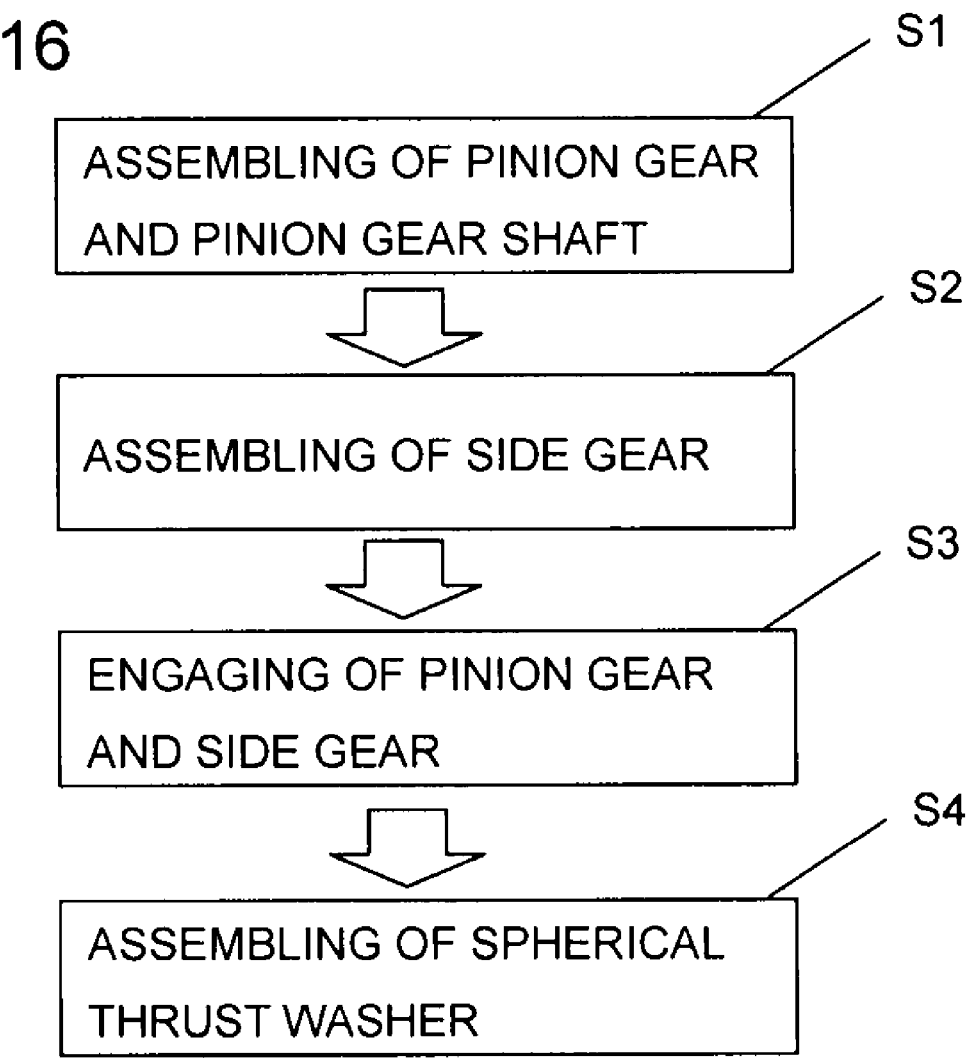

US 8,216,105 B2

DIFFERENTIAL APPARATUS FOR VEHICLE AND ASSEMBLING METHOD THEREOF

INCORPORATION BY REFERENCE

The present application claims priority under 35 U.S.C. §119 to Japanese Patent Applications No. 2007-286639, filed on Nov. 2, 2007, No. 2007-286640, filed on Nov. 2, 2007, No. 2007-286641, filed on Nov. 2, 2007 and No. 2008-011590, filed on Jan. 22, 2008. The contents of these applications are incorporated herein by reference in their entirety.

BACKGROUND OF THE INVENTION

1. Field of the Invention

The present invention relates to a differential apparatus for a vehicle and an assembling method thereof, and more particularly relates to a differential apparatus for a vehicle and an assembling method thereof having pinion gear supporting portions preventing pinion gears from inclining.

2. Description of the Related Art

It is well known for this kind of the differential apparatus for the vehicle as shown in a prior art as disclosed in a document of a registered utility model No. 2520728.

The prior art of the differential apparatus for the vehicle will be explained hereinafter referred to FIG. 1. In FIG. 1, the differential apparatus 71 for the vehicle includes a differential case 72 rotated by receiving torque from an engine, a pair of side gears 73R, 73L installed in parallel each other along a rotational axis of the differential case 72, and a pinion gear 74 engaging with the side gears 73R, 73L.

The differential case 72 has an accommodating space 72A accommodating the pair of side gears 73R, 73L and the pinion gear 74. In the differential case 72 are mounted a pinion gear inserting hole 75 communicating with the accommodating space 72A and inserting the pinion gear 74 therethrough and also mounted a pair of tire shaft inserted holes 76R, 76L opened to a direction perpendicular to an axis of the pinion gear inserting hole 75.

The pair of side gears 73R, 73L are hollow cylindrical bevel gears having boss portions 79R, 79L and gear portions 80R, 80L to be installed movably along the rotational axis of the differential case 72. The pair of side gears 73R, 73L are rotatably supported in the differential case 72 in the way that the boss portions 79R, 79L face to the tire shaft inserted holes 76R, 76L respectively. With an inside surface of each of the side gears 73R, 73L is engaged a part of each of right and left tire shafts 81R, 81L inserted into each of tire shaft inserted holes 76R, 76L. Annular sliding members 82R, 82L are inserted between back surfaces of the gear portions 80R, 80L of the side gears 73R, 73L and inner opened peripheral edges of the shaft inserted holes 76R, 76L.

The pinion gear 74 is a hollow cylindrical bevel gear held by a pinion gear stopper 83 and is rotatably supported in a pinion gear inserting hole 75. At a center axis portion of the pinion gear 74 is mounted a shaft penetrating hole 74A penetrated by a pinion gear shaft 84 for preventing the pinion gear from inclining.

Upon the construction of the prior differential apparatus for the vehicle, when torque from the engine of the vehicle is input to the differential case 72 through the drive pinion and the ring gear, the differential case 72 is rotated around the rotating axis. Upon the rotation of the differential case 72, rotational force is transferred to the pinion gears 74 through the pinion gear shaft 84 and to the side gears 73R, 73L through the pinion gears 74. Because the right and left side gears 73R, 73L are engaged with the tire shafts 81R, 81L in spline fitting respectively, torque from the engine is transmitted to the right and left tire shafts through the drive pinion, the ring gear, the differential case 72, the pinion gear shaft 84, the pinion gears 74, the side gears 73R, 73L.

In this case, since the pinion gear 74 slides on each of the supporting surfaces of the pinion gear inserting hole 75 and the pinion gear shaft 84 upon the rotation of the pinion gear 74, frictional resistance is generated between the pinion gear 74 and each of the supporting surfaces, thereby to restrict the differential rotation of the side gears 73R, 73L.

And also, since thrust force is generated at engaging surfaces of the pinion gear 74 with the side gears 73R, 73L upon the rotation of pinion gear 74, the side gears 73R, 73L are moved to be separated each other by the thrust force to press the sliding member 82R, 82L to the inner opened peripheral edges of the tire shaft inserted holes 76R, 76L so that another frictional resistance is generated between the sliding member 82R, 82L and the tire shaft inserted holes 76R, 76L, thereby restricting the differential rotation of the side gears 73R, 73L.

However, in the prior art of the differential device for the vehicle disclosed in the registered utility model document, there happen next wrong phenomena. The pinion gear supporting surface of the pinion gear 74 includes a first sliding portion formed with a circular peripheral portion at a back surface of the pinion gear 74, that is at end face far from the rotational axis of the differential case 72 of both opposite ends of the pinion gear 74 along its axial direction, and a second sliding portion formed with a part of an outer peripheral surface of the gear portion engaging with the side gears 73R, 73L at near to the rotational axis of the differential case in comparison that the first sliding portion is. Therefore, the engaging area between the inner surface of the pinion gear inserting hole 75 and the second sliding portion upon the rotational phase of the pinion gear 74 so that there is no stable differential restricting torque and a size of engaging area of the pinion gear 74 can not be set as enough large size, thereby it is not able to achieve high flexibility of setting a higher torque bias ratio TBR.

SUMMARY OF THE INVENTION

In view of the previously mentioned circumstances, it is an object of the present invention to provide a differential apparatus for a vehicle and assembling method thereof obtaining a stable differential restricting torque and achieving high flexibility of setting a higher torque bias ratio TBR.

In order to achieve the above and other objects, one feature of the present invention provides a differential apparatus for a vehicle mainly constructed that each of engaging portions of at least one pair of pinion gears with one pair of side gears does not include a supported portion by said differential case and is positioned at a near side to the rotational axis in comparison that each of gear collar portions is positioned. Thereby, the differential apparatus for the vehicle of the present invention can execute the stable slide of the pinion gears sliding a first sliding surface of the pinion gears on the first pinion gear supporting portion of the differential case without using any sliding surface of the engaging portions of the pinion gears and can make sufficient large sizes of the engaging area of both gear surfaces of the pinion gears to be able to achieve the high flexibility of setting the higher torque bias ratio.

Second feature of the present invention provides a differential apparatus for a vehicle constructed mainly that a differential case includes a first pinion gear supporting portion supporting rotatably at least one pair of pinion gears by sliding an outer peripheral surface of a gear collar portion, a pinion gear shaft includes a second pinion gear supporting portion supporting rotatably at least one pair of pinion gears by sliding an inner surface of a shaft penetrating hole, and the second pinion gear supporting portion is positioned at a near side to a rotational axis of the differential case in comparison that the first pinion gear supporting portion is positioned.

Thereby, the present invention can restrict the inclination of the pinion gears steadily so that it is possible to restrain the generation of seizure or wear concentration of the pinion gears or its supporting surfaces, especially the edge portion of the pinion gears, and also to maintain the good engagement in mesh between the pinion gears and the side gears and to obtain the stable differential restricting torque, and also to achieve the high flexibility of setting the higher torque bias ratio.

Third feature of the present invention provides a differential apparatus for a vehicle constructed mainly that a diameter of a tooth tip of each gear portion engaging with one pair of side gears is larger than an outer diameter of the gear collar portion. Thereby, the present invention can set the bigger size of the engaging area of both gear surfaces of the gear portions of the pinion gears and to widen the engaging area between the gear portions and the side gears, and thereby to achieve the flexibility of setting the higher torque bias ratio.

Fourth feature of the present invention provides a differential apparatus for a vehicle constructed mainly that a tooth number N of each of engaging portions of at least one pair of pinion gears with one pair of side gears is set under condition of $6 \leq N \leq 8$. Thereby, the present invention can enforce the bending strength of the pinion gears and make the effect that there is no need to set the bigger whole size of the pinion gears, thereby to restrict to make the whole size of the differential case larger.

Fifth feature of the present invention provides an assembling method of a differential apparatus for a vehicle constructed mainly each step of; a first step of inserting one pair of pinion gears into a differential case, and penetrating a pinion gear shaft through a shaft penetrating hole to be supported by a differential case; and a second step of inserting the one pair of side gears into the differential case, engaging the one pair of side gears with engaging portions of the one pair of pinion gears supported in advance by the one pair of pinion gear supporting portions, and, in maintaining this state, rotating the one pair of side gears around an axis of the pinion gear shaft to install the one pair of side gears on a rotational axis of said differential case. Thereby, since there is no any thrust washer to be inserted between the sliding portion of the back surfaces of the side gears and the inner opened peripheral edges of the tire shaft inserted holes, it is possible for the present invention to reduce work time, thereby simplifying its assembling operation and reducing the assembling cost.

Sixth feature of the present invention provides an assembling method of a differential apparatus for a vehicle constructed mainly each step of; a first step of inserting one pair of pinion gears into a differential case, and penetrating a pinion gear shaft through a shaft penetrating hole to be supported by a differential case; a second step of inserting one pair of side gears into the differential case, rotating the one pair of side gears around an axis of the one pair of pinion gears to install the one pair of side gears on a rotational axis of the differential case; and a third step of moving the one pair of side gears along the rotational axis, engaging the one pair of side gears with engaging portions of the one pair of pinion gears, and then inserting each of washers between back surfaces of the one pair of side gears and the inner opened peripheral edges of one pair of tire shaft inserted holes.

Thereby, since the spherical thrust washers having its thickness corresponding to the space between the side gears and thrust washer receiving portions can be inserted between the side gears and the thrust washer receiving portions, the present invention can absorb any assembling error along the rotational axis in the differential case.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 16 is a flow chart showing explanations of assembling method of a differential apparatus for a vehicle according to third embodiment of the present invention.

DETAILED DESCRIPTION OF THE PREFERRED EMBODIMENTS

[First Embodiment]
[Whole Construction of the Differential Apparatus for the Vehicle]

Figure 1:
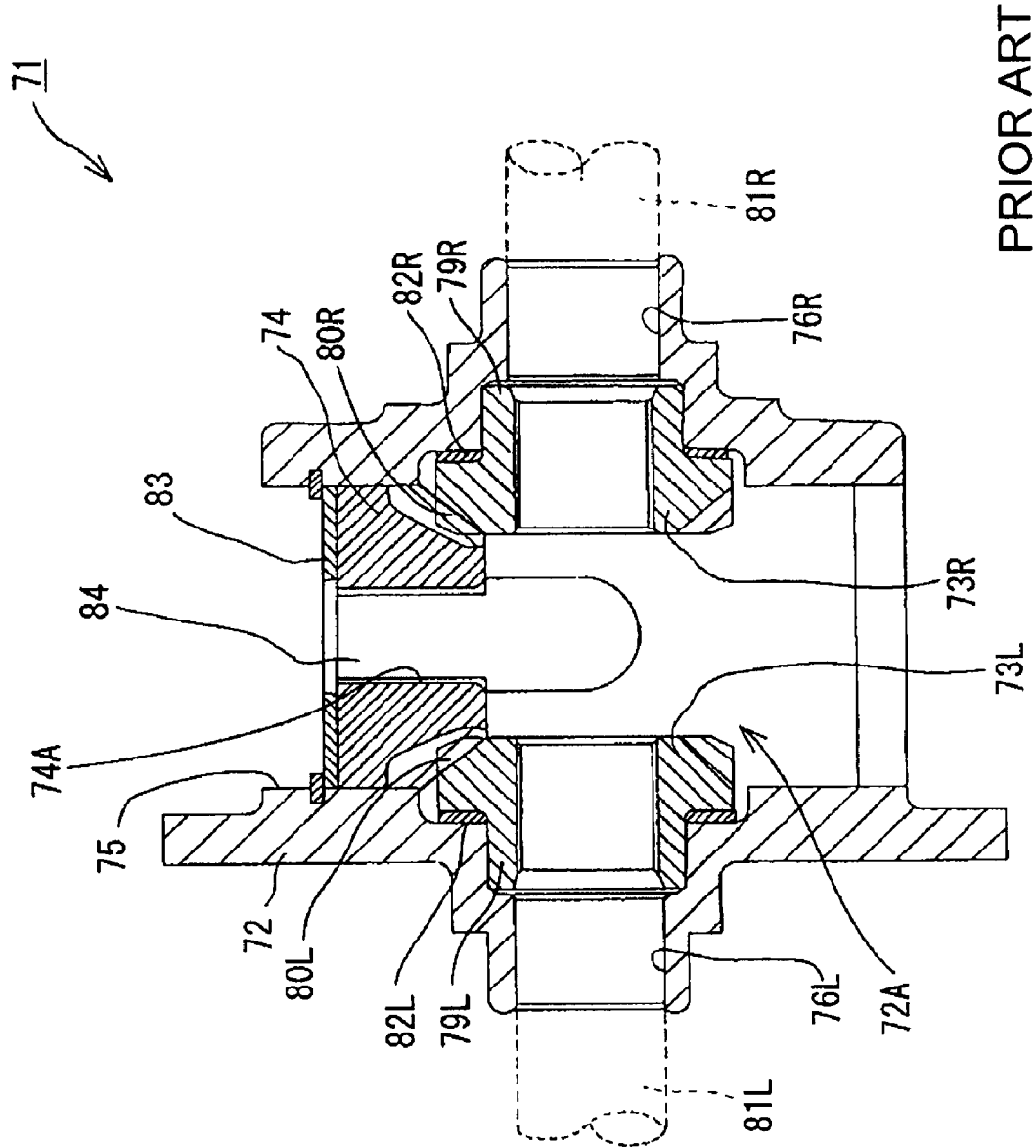
FIG. 1 is a cross sectional drawing explaining a prior differential apparatus for a vehicle.
Figure 2:
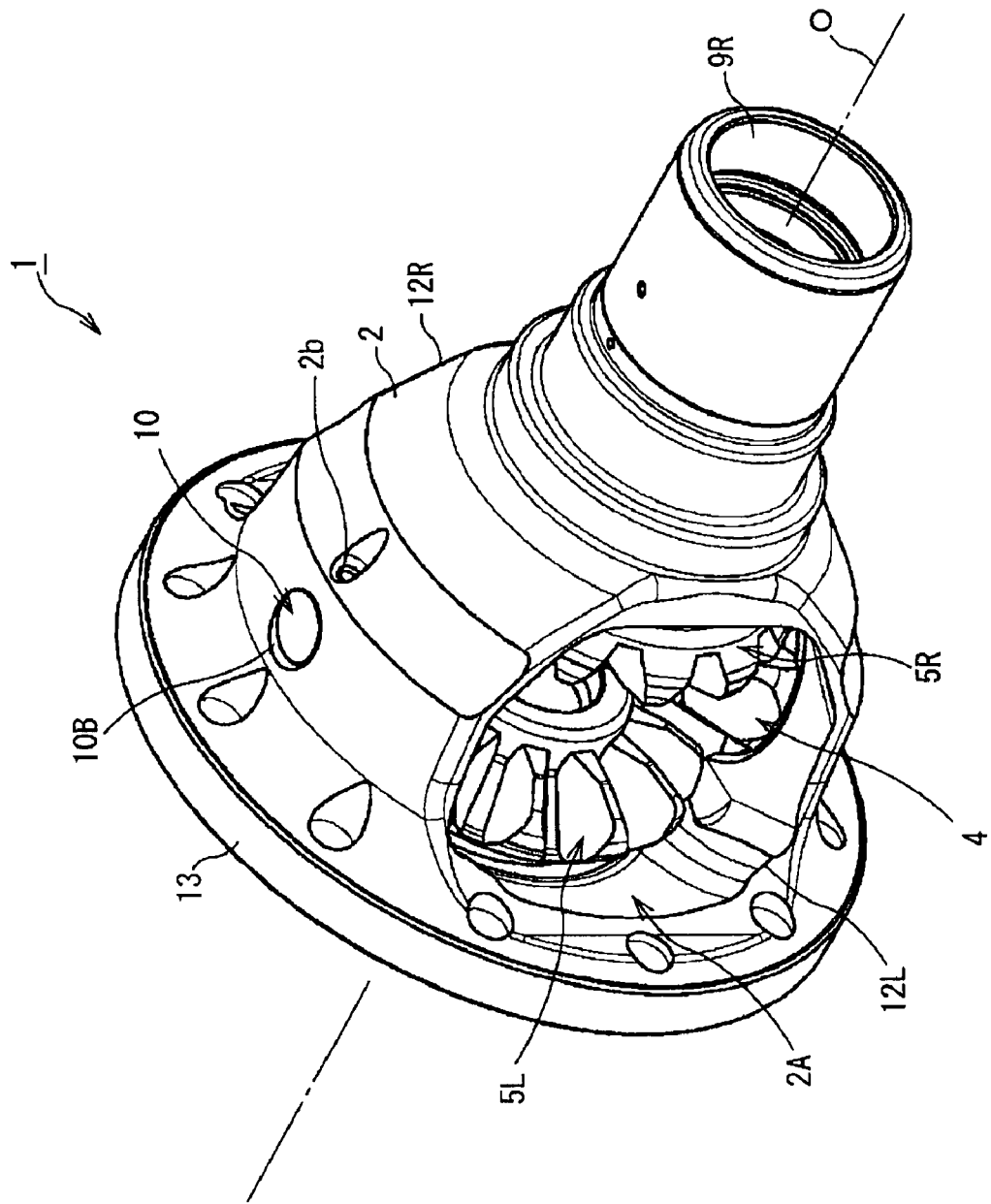
FIG. 2 is an oblique perspective diagram explaining a differential apparatus for a vehicle according to first embodiment of the present invention.
Figure 3:
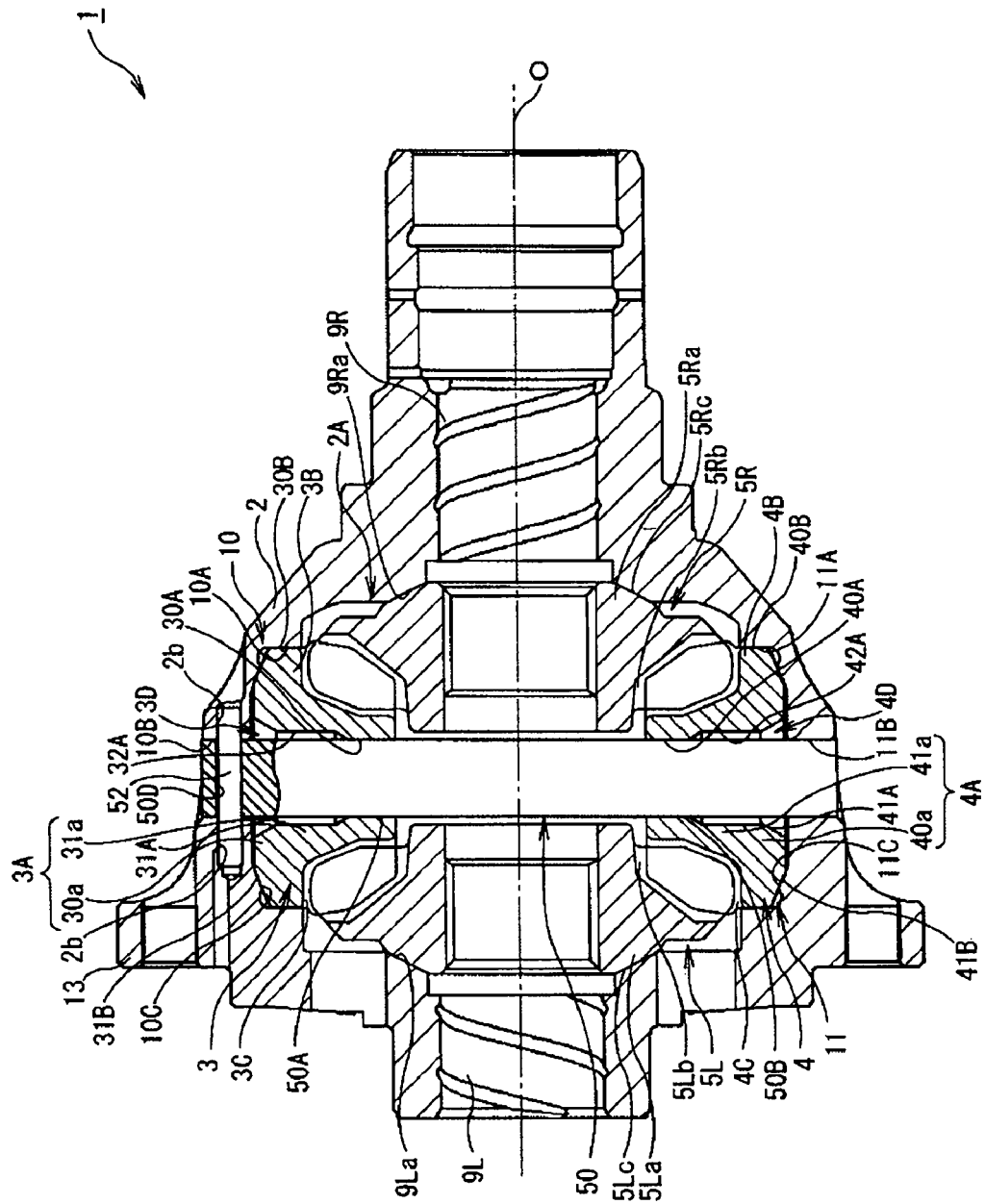
FIG. 3 is a cross sectional drawing explaining a differential apparatus for a vehicle according to first embodiment of the present invention.

In FIG. 2 and FIG. 3, a numeral 1 shows the differential apparatus for the vehicle. The differential apparatus 1 mainly constitutes of a differential case 2, a pinion gear shaft 50, a pair of pinion gears 3, 4 and a pair of side gears 5R, 5L. The differential case 2 is rotated by receiving a torque from an engine. The pinion gear shaft 50 is positioned on an axis perpendicular to a rotational axis O of the differential case 2. Each of the pair of pinion gears 3, 4 is aligned in parallel each other on the pinion gear shaft 50. The pinion gears 3, 4 engage respectively in mesh with the side gears 5R, 5L of which gear axes are perpendicular to gear axes of the pinion gears 3, 4 respectively.

[Construction of the Differential Case 2]

Figure 7:
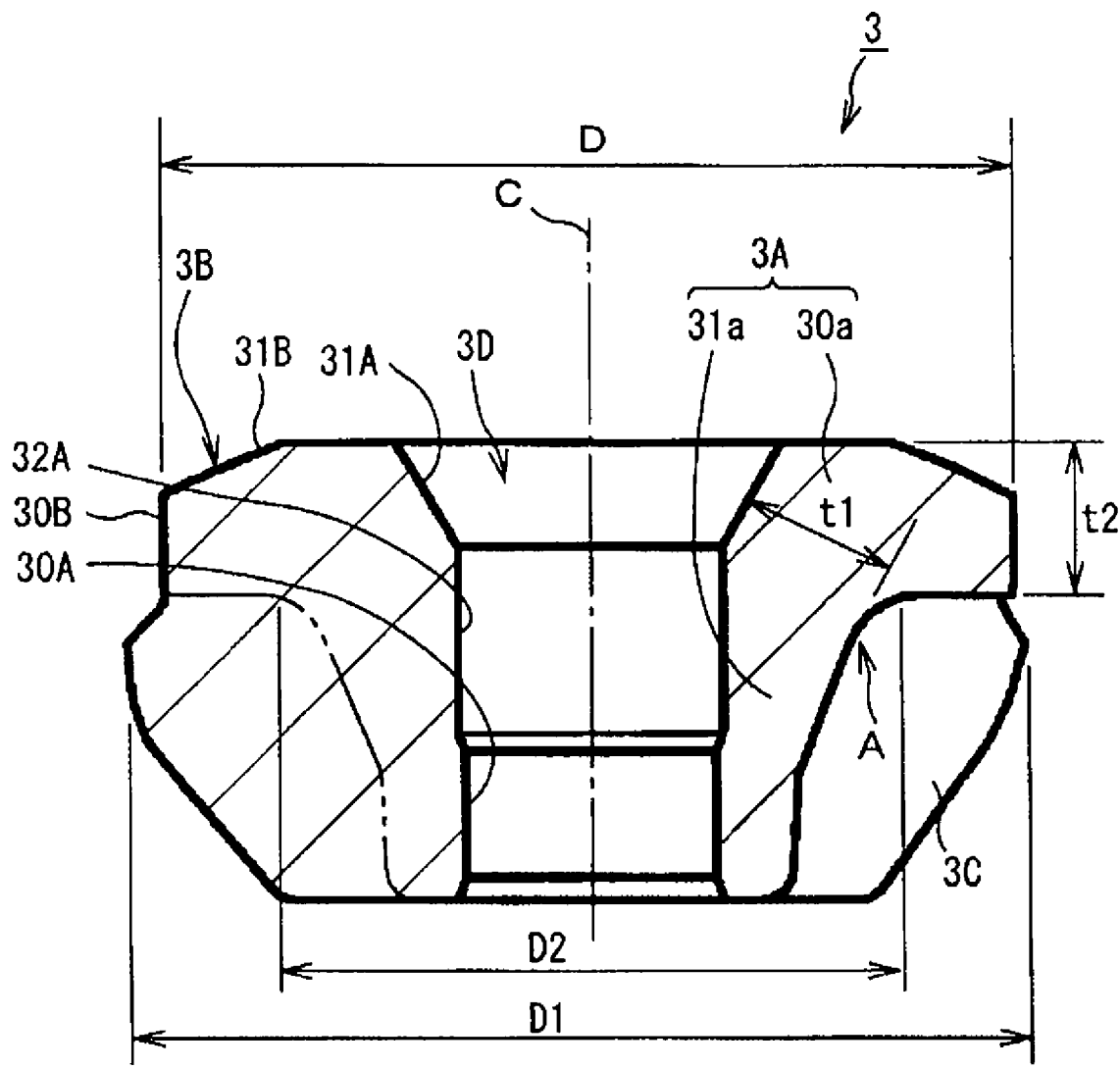
FIG. 7 is cross sectional drawing showing explaining a pinion gear of a differential apparatus for a vehicle according to first embodiment of the present invention.
Figure 8:
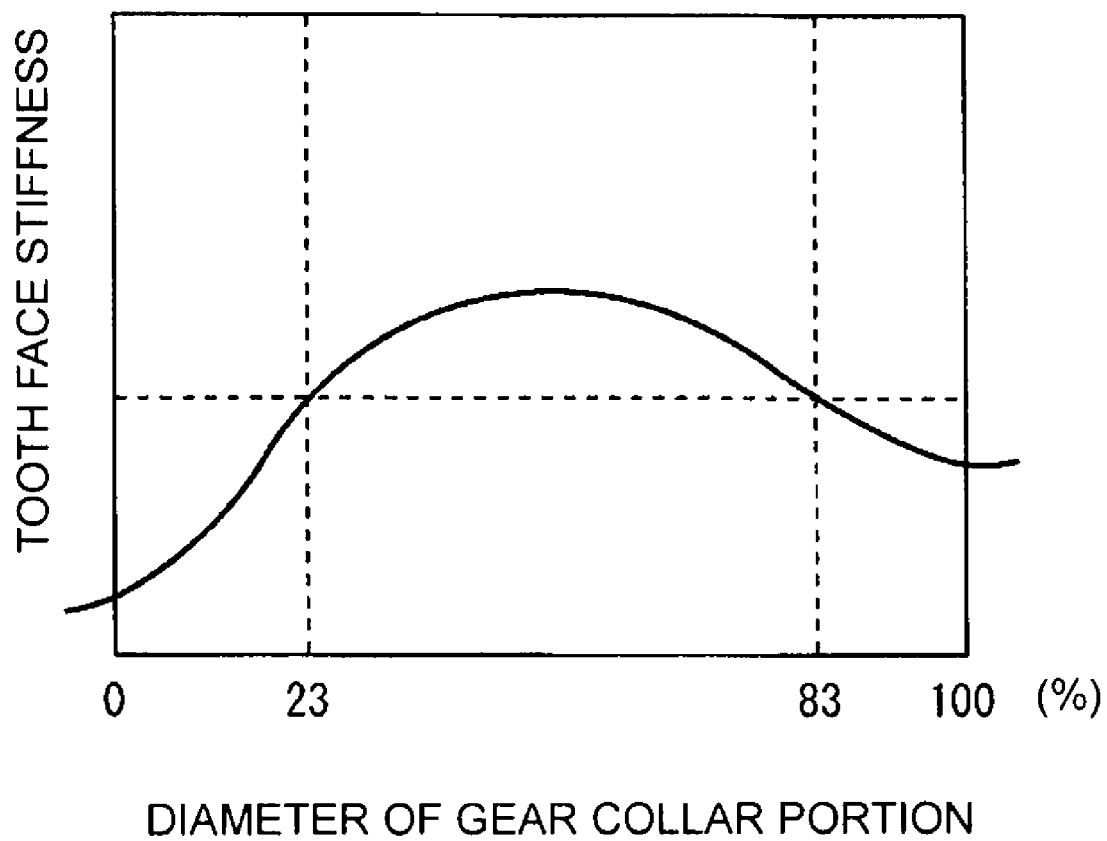
FIG. 8 is a graph showing a result of stress dispersion effect of a differential apparatus for a vehicle according to first embodiment of the present invention.

As shown in FIGS. 3, 7 and 8, the differential case 2 has a space portion 2A accommodating the pinion gears 3, 4 and the side gears 5R, 5L and the differential case 2 is constructed with one peace of material as a whole.

Figure 4:
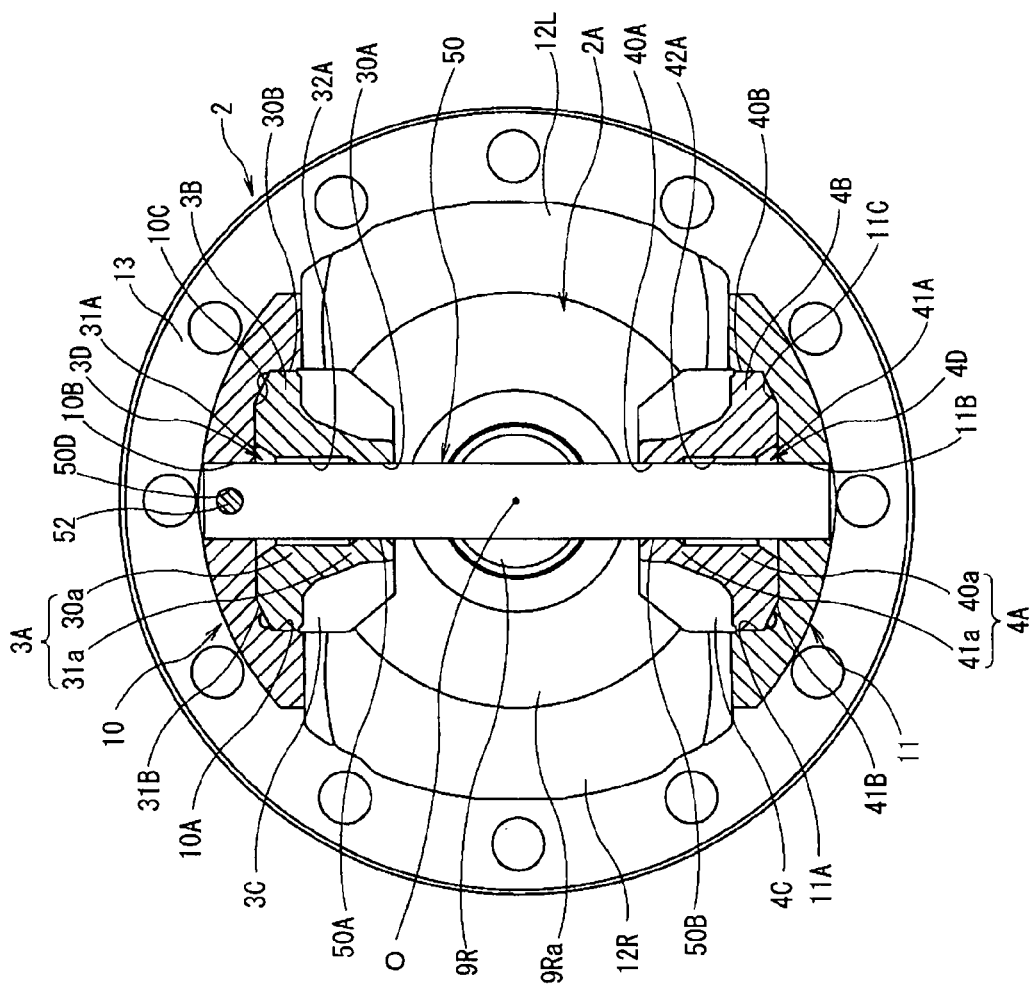
FIG. 4 is a cross sectional drawing showing an assembling state of pinion gears and side gears to a differential case of a differential apparatus for a vehicle according to first embodiment of the present invention.

The differential case 2 provides, as shown in FIGS. 2, 3, two right and left tire shaft inserted holes 9R, 9L, gear/shaft supporting portions 10, 11 and two pin mounting holes 2b, 2b. The right and left tire shaft inserted holes 9R, 9L are opened along the rotational axis O. The gear/shaft supporting portions 10, 11 have a common axis perpendicular to a common axis of the right and left tire shaft inserted holes 9R, 9L. The two pin mounting holes 2b, 2b are formed in a line at same angular distance of 180 degrees around an axis of one gear shaft supporting portion 10 of the two gear/shaft supporting portions 10, 11. In the differential case 2, as shown in FIG. 4, it is provided that side gear penetrating openings 12R, 12L positioned each other at equal distance apart from the gear/shaft supporting portion 10, 11 in circumferential direction. In a left portion of the differential case 2 at a side of the tire shaft, as shown in FIGS. 2 and 3, is provided an annular ring gear mounting flange 13 peripherally projected as a body with the differential case 2 in a perpendicular plane to the rotational axis O.

The tire shaft inserted holes 9R, 9L are formed each as an inner penetrating hole having a same inner diameter as shown in FIG. 3. In the tire shaft inserted holes 9R, 9L are respectively penetrated by each unillustrated tire shaft in right and left positions. In an inner opened peripheral edge of the tire shaft inserted holes 9R, 9L are provided side gear receiving portions 9Ra, 9La receiving the side gears 5R, 5L slidably and the side gear receiving portions 9Ra, 9La are formed as a spherical surface.

The gear/shaft supporting portions 10, 11 include circular penetrating holes which are opened out of and into the differential case 2 along an axis perpendicular to the rotational axis O and are respectively stepped open holes, an inner diameters of the inner sides of which are respectively larger than inner diameters of the outer sides of penetrating open holes as shown in FIG. 3. The inner diameter sizes of the inner sides of penetrating open holes are respectively almost same to outer diameter sizes of the pinion gears 3, 4 which are smaller than outer diameter sizes of the side gears 5R, 5L.

The inner surfaces of the inner sides of the penetrating open holes of the gear/shaft supporting portions 10, 11 are respectively placed far position from the rotational axis O compared to that from a center point of an engaging portions of pinion gears 3, 4 and the side gears 5R, 5L along the axial direction of the pinion gear shaft 50, and these inner surfaces are first pinion gear supporting surfaces 10A, 11A supporting rotatably the pinion gears 3, 4 for a slide of the pinion gears 3, 4 without changing a sliding area with outer peripheral surfaces of pinion gear collar portions 3B, 4B described hereinafter. In other words, the engaging portions of the pinion gears 3, 4 with the side gears 5R, 5L is positioned at a near side to the rotational axis O in comparison that the gear collar portions 3B, 4B is positioned. The center point is a load center in the engaging area of both gear surfaces of the pinion gears 3, 4 and the side gears 5R, 5L in transmission of torque from the pinion gears 3, 4 to the side gears 5R, 5L.

The inner surfaces of the outer sides of the penetrating open holes of the gear/shaft supporting portions 10, 11 are placed far from the rotational axis O of the differential case 2 compared to the first pinion gear supporting surfaces 10A, 11A as shown in FIG. 4, and these inner surfaces are pinion gear shaft supporting surfaces 10B, 11B supporting both opposite sides of the pinion gear shaft 50 non-rotatably around its own axis and non-movably along its own axis.

On the inner surfaces of the stepped open holes of the gear/shaft supporting portions 10, 11 are pinion gear receiving portions 10C, 11C that are spherical surfaces having a predetermined curvature. The pinion gear receiving portions 10C, 11C receive a top portion of the pinion gears 3, 4.

The pin mounting holes 2b, 2b are opened at the inner surfaces of the first pinion gear supporting portions 10 along the rotational axis O as shown in FIG. 3. In the pin mounting holes 2b, 2b are fixed both ends of pin 52 penetrating through pin penetrating hole 50D of the pinion gear shaft 50. Thereby, the pinion gear shaft 50 is supported by the differential case 2 through the pin 52 so that the pinion gear shaft 50 is baffled its rotation and its axial movement.

As shown in FIGS. 2 and 4, the side gear penetrating openings 12R, 12L are constructed with a penetrating hole having an opening with a non-circular shape in a plane. A size of this opening is enough to be inserted with the pinion gears 3, 4 and the side gears 5L, 5R into inside the differential case 2.

[Construction of the Pinion Gear Shaft 50]

The pinion gear shaft 50 includes second pinion gear supporting surfaces 50A, 50B supporting rotatably the pinion gears 3, 4 by the way that the pinion gears 3, 4 slide on inner surfaces of shaft penetrating holes 3D, 4D, described hereinafter, of the pinion gears 3, 4 as shown in FIG. 3. The pinion gear shaft 50 is supported by pinion gear shaft supporting surfaces 10B, 11B of the gear/shaft supporting portions 10, 11 of the differential case 2 and penetrates through the shaft penetrating holes 3D, 4D of the pinion gears 3, 4. The outer surfaces of the pinion gear shaft 50 are fit without any clearance to the pinion gear shaft supporting surfaces 10B, 11B to be fixed to the differential case 2 without any relative movements.

The second pinion gear supporting surfaces 50A, 50B are provided on the pinion gear shaft 50 on opposite side of the rotational axis O. The second pinion gear supporting surfaces 50A, 50B are positioned at a predetermined distance apart from the gear/shaft supporting portions 10, 11. Each at least a portion of the second pinion gear supporting surfaces 50A, 50B is positioned along an axis of the pinion gear shaft 50 nearer to the rotational axis O of the differential case 2 than from each of the engaging points of the pinion gears 3, 4 with the side gears 5R, 5L.

[Construction of the Pinion Gears 3, 4]

Since construction of the pinion gears 3, 4 are almost same each other, only the construction of the pinion gear 3 will be explained hereinafter. Besides, each part of the remaining pinion gear 4 is identified by the same suffix to each part of the pinion gear 3 to be eliminated in the explanation of the first embodiment, for example, a gear barrel portion of the pinion gear 4 is identified as 4A corresponding to a gear barrel portion 3A of the pinion gear 3 and gear collar portion of the pinion gear 4 is identified as 4B corresponding to the gear collar portion 3B of the pinion gear 3.

Figure 6A:
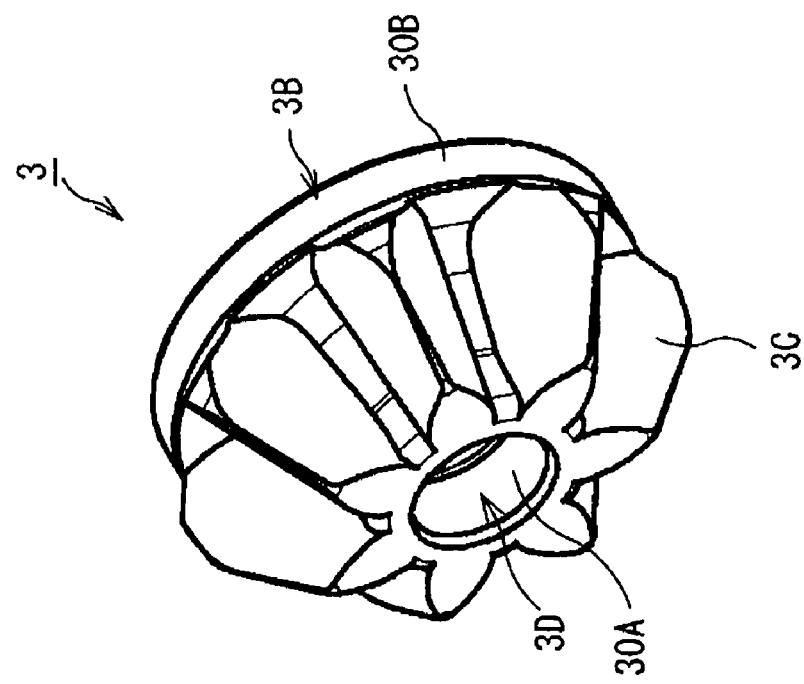
FIG. 6A and FIG. 6B are oblique perspective diagrams explaining a pinion gear of a differential apparatus for a vehicle according to first embodiment of the present invention.
Figure 6B:
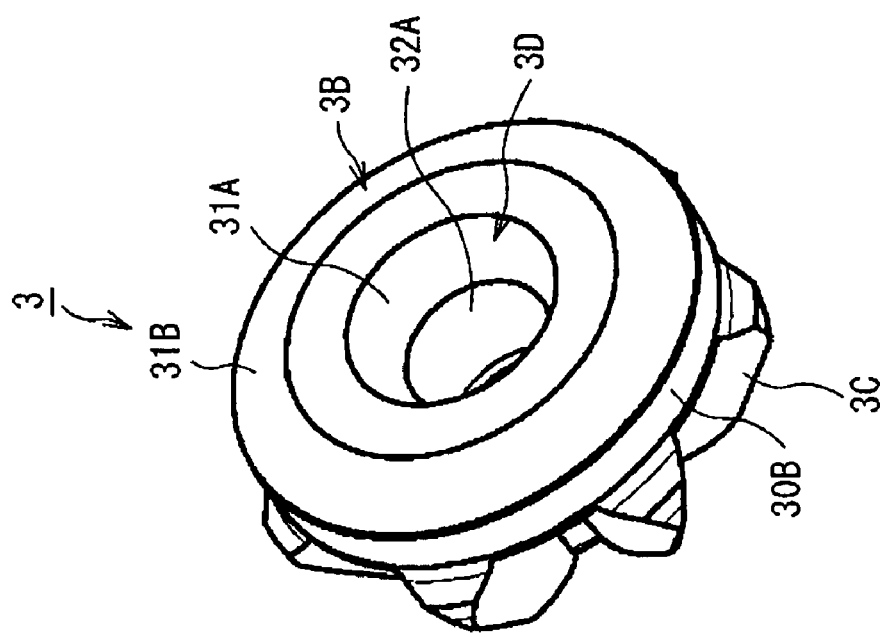

The pinion gear 3 is, as shown in FIGS. 6A, 6B and FIG. 7, a cylindrical bevel gear without having any bottom and includes the gear barrel portion 3A having a center axis as a gear axis C, the gear collar portion 3B as a first supported portion projecting outside of the gear barrel portion 3A and a gear portion 3C positioned at a side of the side gear of the gear collar portion 3B to be an engaging portion with the side gears 5R, 5L. The pinion gear 3 is rotatably supported by the first pinion gear supporting surface 10A of the gear/shaft supporting surface 10 and the second pinion gear supporting surface 50A of the pinion gear shaft 50 as shown in FIG. 3. A number of a tooth of the gear portion 3C is seven compared to nine or ten of a tooth number of the conventional differential apparatus for the vehicle.

The gear barrel portion 3A has a shaft penetrating hole 3D inserting the pinion shaft 50 in the axial center of the pinion gear 3 as shown in FIG. 3. The gear barrel portion 3A is a cylindrical body including an annular cylindrical first gear barrel portion 30a and a second gear barrel portion 31a being a shape of a circular truncated cone. The outer portion of the gear barrel portion 3A is connected with the gear collar portion 3B by a smooth concave curve surface.

The shaft penetrating hole 3D is a stepped hole having a large, a medium, a small inner surfaces having a different diameter respectively as shown in FIG. 7. The small inner surface having a smallest diameter is positioned at the nearest position, compared to other inner surfaces, closed to the rotational axis O of the differential case 2. The small inner surface is a second sliding surface 30A as a second supported portion slid on the second pinion gear supporting surface 50A of the pinion gear shaft 50.

The large inner surface having a largest inner diameter is positioned at the far position, compared to the second sliding surface 30A, from the rotational axis O of the differential case 2. The large inner surface is a non-sliding surface 31A that is not slid on the outer peripheral surface of the pinion gear shaft 50.

The medium inner surface having a medium inner diameter between the largest and the smallest diameters is disposed between the second sliding surface 30A and the non-sliding surface 31A and is a non-sliding surface 32A without sliding on the peripheral surface of the pinion gear shaft 50. An opening portion of the shaft penetrating hole 3D in back side of the pinion gear is an opening portion widening the opening area according to approach to the gear back side from the medium portion along the gear axis.

The gear back side is an end surface placed at far position from the rotational axis O of the differential case 2 selected from the both end surfaces of the pinion gear 3.

The first gear barrel portion 30a is installed on the gear back side of the gear barrel portion 3A and the second gear barrel portion 31a is installed on a gear top end portion of the gear barrel portion 3A, the gear top end portion which is in opposite side from the gear back side along the axial direction of the gear barrel portion 3A. The gear collar portion 3B is formed on the outer peripheral surface of the first gear barrel portion 30a and a tooth base of the gear portion 3C is formed on the outer peripheral surface of the second gear barrel portion 31a.

The gear collar portion 3B is mounted on the outer whole peripheral surface of the first gear barrel portion 30a as shown in FIG. 3. The gear collar portion 3B is an annular circular body having a uniform diameter along the gear axis. The gear collar portion 3B is constructed with function as a gear base portion of the pinion gear 3 as a T-shape in section with the gear barrel portion 3A and the gear base portion is a portion except for the gear portion 3C in the pinion gear 3.

A curved portion A of the gear base is set in a way that its thickness t1 is approximately equal to a maximum thickness t2 of the gear collar portion 3B, that is t1≈t2, as shown in FIG. 7 so that it is achieved even stiffness at the gear base portion.

The outer peripheral surface of the gear collar portion 3B is the first sliding surface 30B being the first sliding surface 30B as the first supported portion sliding on the pinion gear supporting surface 10A of the gear/shaft supporting portion 10 as shown in FIG. 3 and FIG. 7.

A back surface of the gear collar portion 3B adapts to the pinion gear receiving portion 10C of the gear/shaft supporting portion 10 as shown in FIG. 3 and FIG. 7, therefore the third sliding surface 31B performs as a third supported portion to be supported by pinion gear receiving portion 10C on which third sliding surface 31B of the pinion gear 3 slides.

The gear portion 3C does not include any sliding portion as a supported portion by the differential case 2 like the prior art does, therefore the gear portion 3C is positioned at a near position to the rotational axis of the differential case 2 compared to the gear collar portion 3B is, as a part of the present invention.

One of an end edge of the gear portion 3C at a side of the gear back surface is formed as one body with an end surface of the gear collar portion 3B at a side of the gear edge. A diameter D1 of a tooth tip of the gear portion 3C is set to be larger than an outer diameter D of the gear collar portion 3B, that is D1>D. Thereby, a size of a tooth face of the gear portion 3C can be set to a larger size to enlarge the engaging area of the gear portion 3C with the side gears 5R, 5L, thereby to be able to heighten flexibility to set the torque bias ratio. And also, since the gear collar portion 3B performs function as a reinforced material for the gear portion 3C, it can scatter stress acted on the pinion gear 3 by load from the side gears 5R, 5L and it can reduce the tooth number of the gear portion 3C so that it can reach to higher bending stress of the gear tooth of the gear portion 3C, in other words, it can enforce strength of the tooth face. As a result, it can reduce any movement of the engaging point of the pinion gear 3 with the side gears 5R, 5L so that it achieves to gain a stable differential restricting torque. More over, since the bending stress is strengthened by reducing the tooth number of the gear portion 3C, there is no need to set a bigger size of the whole pinion gear itself, thereby intercept to make a large size of the differential case 2.

Hereinafter, it is explained next two items of the pinion gear 3 in the differential apparatus 1 for the vehicle based on FIGS. 3, 8, 9. The two items are;

1. Effect of stress dispersion, and
2. Effect of reduction of tooth number.
1. Effect of stress dispersion Inventor tries many experiments that it is prepared ten different kinds of gears having respectively a different outer diameter D of the gear collars 3B, 4B of the pinion gears 3, 4 and drives the differential apparatus 1 for the vehicle for a predetermined period of time, thereafter the strength of the tooth face is respectively measured from the stress at the engaging face with the side gears 5R, 5L of each of gears.

The result of the experiments is shown in FIG. 8 where percentage for the outer diameter D of the gear collar portion 3B, 4B of the pinion gears 3, 4 is set as follows; if the outer diameter D of the gear collar portion 3B, 4B of the pinion gears 3, 4 equals to the diameter of the tooth tip of the gear portions 3C, 4C the percentage is 100%, that is D=D1=100%, and if the outer diameter D of the gear collar portion 3B, 4B equals to the diameter D2 of a tooth root of the end edge of the gear back surface, the percentage is 0%, that is D=D2=0%. From this result it is recognized that a condition of the tooth face strength over a predetermined tooth face strength is diameter D=23 to 83% so that the effect of the stress dispersion is realized. Besides, the diameter D=23% shows a size of diameter D is a size of D=D2+(D1−D2)×0.23.

On the other hands, where the outer diameter D of the gear collar portion 3B, 4B is in the condition of 0≦D<23%, the gear in this condition has a low stiffness as a whole so that it does not achieve a desirable tooth face stiffness. And also, where the outer diameter D of the gear collar portion 3B, 4B is in the condition of 83%<D≦100%, the gear in this condition has a high stiffness at restricted area so that concentration of stress is partially occurred and it does not achieve a desirable tooth face stiffness.

In FIG. 8, an axis of ordinate shows the tooth face stiffness and an axis of abscissa shows the diameter of the gear collar portion.

2. Effect of Reduction of Tooth Number

In this first embodiment of the present invention, the tooth number of the pinion gears 3, 4 is set as seven, that is N=7, less than nine or ten, that is N=9 or 10, of the number of the pinion gear in the conventional apparatus. The pinion gears 3, 4 are respectively supported two supporting means. That is to say, the pinion gears 3, 4 are rotatably supported not only at its second sliding surfaces 30A, 40A by the second pinion gear supporting surface 50A, 50B of the pinion gear shaft 50 but also at the first sliding surface 30B, 40B of the gear collar portions 3B, 4B by the first pinion gear supporting surfaces 10A, 11A of the gear/shaft supporting portions 10, 11. Thereby, since the supporting force of the pinion gears 3, 4 is scattered to two supporting means, the pinion gear shaft 50 can be slimmer than that of the conventional differential apparatus for the vehicle, thereby it is realized to reduce the tooth number of the pinion gears 3, 4.

The second experiments are performed by the way that the six differential apparatuses for the vehicle are driven for the predetermined period of time, each of which has the gear of the differential tooth number each other, that is N=5 to 10, and then each of the tooth face strength is measured from the stress at the engaging surface with the side gears 5R, 5L.

Figure 9:
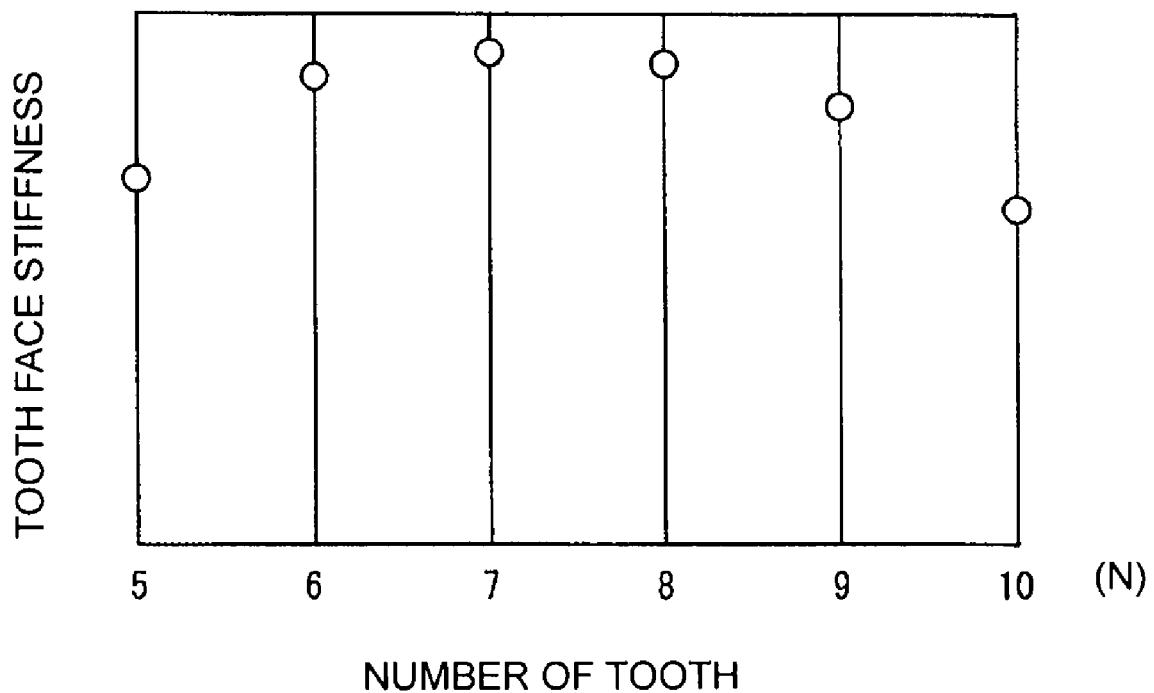
FIG. 9 is a graph showing a result of tooth number reduction effect of a differential apparatus for a vehicle according to first embodiment of the present invention.

The result of the second experiments is shown in FIG. 9 where the tooth face strength having six to eight of tooth number N exceeds a desired tooth face strength, thereby it is recognized that the differential apparatuses 1 for the vehicle has the effect of reduction of the tooth number.

On the other hands, it shows that the gear having five teeth, that is the tooth number N=5, does not achieve the desired tooth face strength. The reason of this phenomenon is a geometric figure of the tooth root is under-cut deeply, thereby to reduce the tooth face strength. It shows also that the gear having nine or ten teeth, that is the tooth number N=9 or 10, does not achieve the desired tooth face strength because a size of an area of the tooth face is small.

In FIG. 9, an axis of ordinate shows the tooth face stiffness and an axis of abscissa shows the number of tooth.

Besides, the pinion gear having 2 to 4 teeth, that is N=2 to 4, is not suitable for real gear because the good engaging ratio does not achieved even thought the pinion gear having 2 to 4 teeth can be manufactured theoretically.

[Construction of the Side Gears 5R, 5L]

As shown in FIGS. 2, 3, the side gears 5R, 5L are almost ring gears having boss portions 5Ra, 5La and gear portions 5Rb, 5Lb, each diameter of which is different each other. An outer diameter of the side gears 5R, 5L is larger than the outer diameter of the pinion gears 3, 4 and the side gears 5R, 5L are a bevel gear having a single conical angle. The side gears 5R, 5L are rotatably supported in the space portion 2A of the differential case 2 to engage in mesh with the pinion gears 3, 4. A number of teeth of the side gears 5R, 5L is more than 1.7 times as many numbers as that of teeth of the pinion gears 3, 4, for example, the number of gears of the side gears 5R, 5L is 12, compared that the number of teeth of the pinion gears 3, 4 is 7. Or it may be set that the number of teeth of the side gears 5R, 5L is more than 2.1 times as many numbers as that of teeth of the pinion gears 3, 4, for example, the number of gears of the side gears 5R, 5L is 15, compared that the number of teeth of the pinion gears 3, 4 is 7.

On a back face of the side gears 5R, 5L are provided sliding portions 5Rc, 5Lc being a spherical surface to be fit to a side gear receiving portions 9Ra, 9La of the differential case 2. Each spherical center of the sliding portions 5Rc, 5Lc is placed on the rotational axis O of the differential case 2. Each of right and left unillustrated tire shafts is individually inserted into the tire shaft inserted holes 9R, 9L of the side gears 5R, 5L with spline fitting.

[Operation of the Differential Apparatus 1 for the Vehicle]

First of all, when torque from the engine of the vehicle is input to the differential case 2 through the drive pinion and the ring gear, the differential case 2 is rotated around the rotating axis O. Upon the rotation of the differential case 2, rotational force is transferred to the pinion gears 3, 4 through the pinion gear shaft 50 and to the side gears 5R, 5L through the pinion gears 3, 4. Because the right and left side gears 5R, 5L are engaged with the unillustrated tire shafts in spline fitting, torque from the engine is transmitted to the right and left tire shafts through the drive pinion, the ring gear, the differential case 2, the pinion gear shaft 50, the pinion gears 3, 4, the side gears 5R, 5L.

Where the vehicle is driven in straight line and there is no slip between the road and each tire on the right and left tire shafts, the pinion gears 3, 4 are revolved without self-rotation around the center axis of the side gears 5R, 5L upon the transmission of the torque from the engine to the housing. The pinion gears 3, 4 and the side gears 5R, 5L are rotated as a body with the differential case 2 so that torque from the engine is transmitted equally to right and left tire shafts to rotate each tire at the same rotational speed.

Where the right tire drops into a muddy ground to occur a slip, the pinion gears 3, 4 are rotated around its own axis as the self-rotation with intermeshing with the side gears 5R, 5L so that torque from the engine is distributed differently to the right and left tires. In actual, the left tire is rotated at lower speed than the speed of the differential case 2 and the right tire is rotated at higher speed than the speed of the differential case 2.

Where the pinion gears 3, 4 are rotated around its own axis during the torque acts on the differential case 2, there occurs frictional resistance between the first sliding surface 30B, 40B of the pinion gears 3, 4 and the first pinion gear supporting surface 10A, 11A and between the second sliding surface 30A, 40A and the second pinion gear supporting surface 50A, 50B of the pinion gear shaft 50 because the first sliding surfaces 30B, 40B slide on the first pinion gear supporting surfaces 10A, 11A and the second sliding surfaces 30A, 40A slide on the second pinion gear supporting surfaces 50A, 50B. These frictional resistances restrict the differential rotation of the side gears 5R, 5L, thereby to restrain the generation of any slip between the right/left tires and the road.

Figure 5:
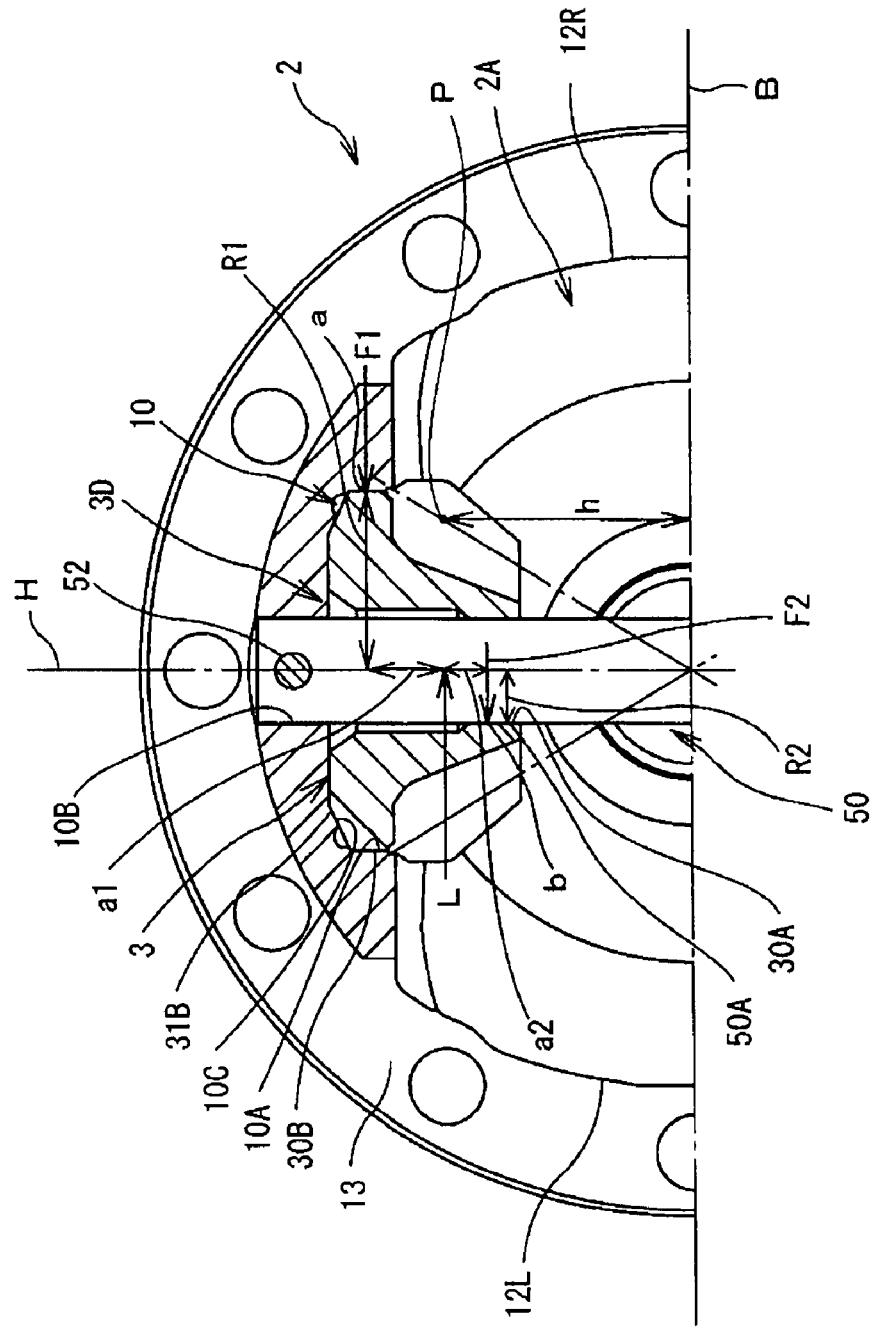
FIG. 5 is cross sectional drawing showing a stable operation of pinion gears of a differential apparatus for a vehicle according to first embodiment of the present invention.

In this occasion, as shown in FIG. 5, when load L is acted on the pinion gears 3, 4 from the side gears 5R, 5L based on the engagement between the pinion gears 3, 4 and the side gears 5R, 5L, reaction force F1 acts on the first pinion gear sliding surfaces 30B, 40B of the pinion gears 3, 4 and reaction force F2 acts on the second pinion gear sliding surfaces 30A, 40A of the pinion gears 3, 4 dispersively, that is L=F1+F2. The reaction force F1 is generated from the first pinion gear supporting surface 10A, 11A of the differential case 2 and the reaction force F2 is generated from the pinion gear supporting surface 50A, 50B of the pinion gear shaft 50 based on the load L. Therefore, the reaction forces F1, F2 act dispersively on two points of the first and second pinion gear sliding surfaces 30B/40B, 30A/40A so that the pinion gears 3, 4 can slide on the pinion gear shaft 50 in a stable state without inclining.

In this case shown in FIG. 5, a differential restricting torque T1 generated between the first sliding surfaces 30B, 40B and the first pinion gear supporting surfaces 10A, 11A is represented as T1=F1×R1×μ where R1 is a constant term of a distance from the axis H of the pinion gears 3, 4 to the first sliding surfaces 30B, 40B and μ is a resistance coefficient. And also, a differential restricting torque T2 generated between the second sliding surfaces 30A, 40A and the second pinion gear supporting surfaces 50A, 50B is represented as T2=F2×R2×μ where R2 is a constant term of a distance from the axis H of the pinion gears 3, 4 to the second sliding surfaces 30A, 40A and μ is a resistance coefficient. Therefore the total differential restricting torque T is represented as T=T1+T2. If F1 equals to F2 the differential restricting torque T1 is larger than the differential restricting torque T2 as T1>T2 because of R1>R2 as shown in FIG. 5.

In FIG. 5, "P" represents an engaging center point of the intermeshing engagement between the pinion gears 3, 4 and the side gears 5R, 5L, "h" represents a distance from a center line B transverse to the rotational axis O of the differential case 2 to the engaging center point P, "a1", "a2" represent distances from the engaging center point P to action points a, b respectively. The distances a1, a2 are variable terms respectively because the distance h is changeable based on deformation or displacement of each parts according to increasing or decreasing of input torque or temperature change, and so on in actual operating condition of the first embodiment of the present invention. Therefore, where any input torque to the pinion gears 3, 4 is equal, that is to say "L×H" is constant, the larger the distance h is, the smaller the "L=F1+F2" is. And also, the smaller the distance a1 is, the larger the "F1/F2" is, because of a moment balancing equation "F1×a1=F2×a2". When the distance h becomes larger, the reaction force F1 becomes larger somewhat to make the differential restricting torque T1 larger and the differential restricting torque T2 smaller. When the distance h becomes smaller, the reaction force F2 becomes larger somewhat to make the differential restricting torque T2 larger and the differential restricting torque T1 smaller. Thereby, it reduces fluctuation of a torque bias ratio, that is the differential restricting torque. And also, the distance h can be changed by dispersion of the figure of the pinion gears 3, 4 or the side gears 5R, 5L based on machining errors, however the fluctuation of the torque bias ratio can be reduced in each of parts.

Figure 10A:
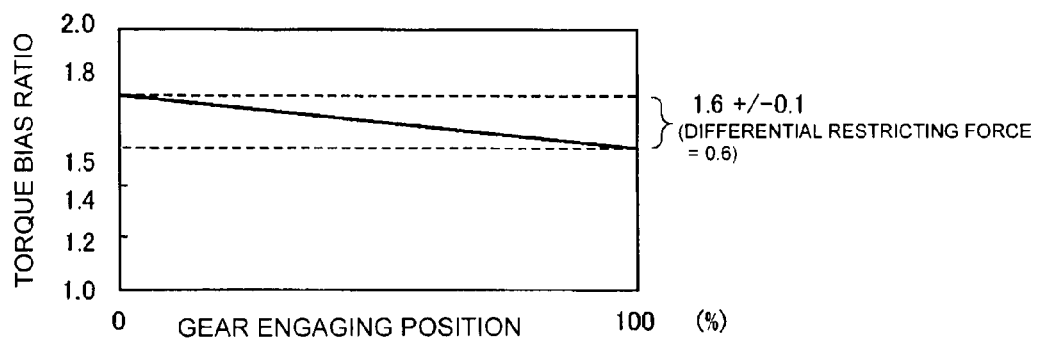
FIG. 10A and FIG. 10B are graphs showing reduction results of the fluctuation of the torque bias ratio of a differential apparatus for a vehicle according to first embodiment of the present invention.
Figure 10B:
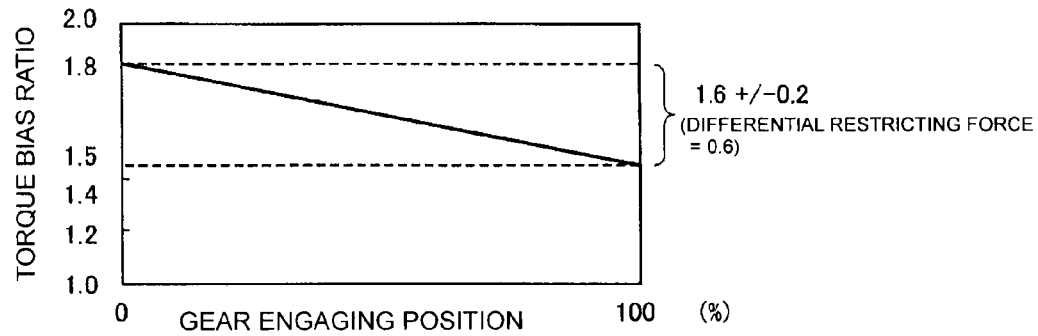

These phenomena are shown in FIG. 10A or FIG. 10B. FIGS. 10A, 10B are explanatory graphic charts explaining reduction result of the fluctuation of the torque bias ratio in the differential apparatus 1 for the vehicle according to the first embodiment of the present invention. FIG. 10A shows the torque bias ratio vs. the gear engaging position of the shaft type of the differential apparatus for the vehicle according to the present invention and FIG. 10B shows the torque bias ratio vs. the gear engaging position of the shaft-less type of the differential apparatus for the vehicle. In FIGS. 10A, 10B an axis of ordinate shows the torque bias ratio and an axis of abscissa shows the gear engaging position between the pinion gears and the side gears. The gear engaging position is represented by a percentage of the distance h from the rotational axis O to the engaging center point P. For example, the distance h1=100% shows the distance to the unillustrated engaging center point P1 where the both pinion gears and the side gears are engaged in mesh each other at the farthest position from the rotational axis O of the differential case 2, and the distance h2=0% shows the distance to the unillustrated engaging center point P2 where the both pinion gears and the side gears are engaged in mesh each other at the nearest position from the rotational axis O of the differential case 2.

In the shaft type of the differential apparatus for the vehicle according to the present invention as shown in FIG. 10A, where the torque bias ratio (TBR) is TBR=1.5 to 1.7, that is TBR=1.6±0.1, an amount of a torque transmitting performance is 1.0, an amount of differential restricting torque is 0.6 and an amount of the fluctuation of the differential restricting torque, that is the fluctuation of the torque bias ratio TBR, is ±0.1.

On the other hands, in the shaft-less type of the differential apparatus for the vehicle, as shown in FIG. 10B, without having a pinion shaft of which has a same size and a same torque transmitting capacity to the shaft type of the differential apparatus for the vehicle, where the torque bias ratio TBR is TBR=1.4 to 1.8, that is TBR=1.6±0.2, an amount of a torque transmitting performance is 1.0, an amount of differential restricting torque is 0.6 and an amount of the fluctuation of the differential restricting torque, that is the fluctuation of the torque bias ratio TBR, is ±0.2.

Therefore, the amount of the fluctuation of the torque bias ratio TBR in the shaft type of the differential apparatus for the vehicle according to the present invention is a half, that is ½, of the amount of the fluctuation of the torque bias ratio TBR in the shaft-less type of the differential apparatus for the vehicle so that the fluctuation reducing effect is recognized in the present invention. Besides, it is possible for the present invention to reduce further the fluctuation of the TBR by the way that each of the figures of the pinion gears 3, 4 is optimized or a frictional coefficient between the second sliding surfaces 30A, 40A and the second pinion gear supporting surfaces 50A, 50B is set larger than a frictional coefficient between the first sliding surfaces 30B, 40B and the first pinion gear supporting surfaces 10A, 11A.

By the rotation of the pinion gears 3, 4 around its axis, thrust force is generated on the engagement surface with the side gears 5R, 5L to the each rotational axis direction of the gears. Each of the side gears 5R, 5L is moved to be separated each other by the thrust force to push to the side gear receiving portions 9Ra, 9La so that frictional resistance is occurred between the side gears 5R, 5L and the side gear receiving portions 9Ra, 9La Therefore, the differential rotation of the side gears 5R, 5L is also restricted by this second frictional resistance. And also, the third sliding portions 31B, 41B of the pinion gears 3, 4 are pushed in contact with the pinion gear receiving portions 10c, 11c of the differential case 2 by the thrust resistance occurred on the pinion gears 3, 4 so that frictional resistance is occurred against the rotation of the pinion gears 3, 4 around its own axis. Therefore, the differential rotation of the side gears 5R, 5L is also restricted by this third frictional resistance.

[Assembling Method of the First Embodiment]

The assembling method of the first embodiment of the differential apparatus for the vehicle according to the present invention will be explained hereinafter according to FIG. 3, FIG. 11, FIG. 12A and FIG. 12B. The assembling method of the differential apparatus for the vehicle according to the first embodiment is performed in order of each step of "assemble of pinion gear and pinion gear shaft" and "engagement of pinion gear and side gear"/"assemble of side gear" so that each step will be explained in order.

"Assemble of Pinion Gear and the Pinion Gear Shaft"

First of all the pinion gear 3 is inserted into the differential case 2 to the space portion 2A through the side gear penetrating openings 12R or 12L, then the pinion gear shaft 50 is inserted into the gear shaft supporting portion 10 of the differential case 2 and into the shaft penetrating hole 3D of the pinion gear 3 in this order.

Then, the pinion gear 4 is inserted into the differential case 2 through the side gear penetrating openings 12R or 12L. Thereafter the pinion gear shaft 50 is inserted into the shaft penetrating hole 4D of the pinion gear 4 and into the gear shaft supporting portion 11 of the differential case 2 in this order, then the pin penetrating hole 50D of the pinion gear shaft 50 is aligned in a line to the two pin mounting holes 2b, 2b of the differential case 2 to be supported at its both opposite sides by the pinion gear shaft supporting surfaces 10B, 11B of the gear/shaft supporting portions 10, 11.

The insertion of the pinion gear 4 into the differential case 2 may be practiced before the pinion gear shaft 50 is inserted into the gear/shaft supporting portion 10 of the differential case 2 and into the shaft penetrating hole 3D of the pinion gear 3.

Thereafter, the pin 5 is inserted into the one pin supporting portion 2b of the two pin supporting portions 2b, 2b of the differential case 2, and continuously inserted into the pin inserting portion 50D of the pinion gear shaft 50 and finally inserted into the other pin supporting portion 2b of the two pin supporting portions 2b, 2b of the differential case 2, thereby the pinion gear shaft 50 is fixed on the differential case 2 so that the pinion gear shaft 50 is positioned along its axial direction and around its axis.

Figure 11:
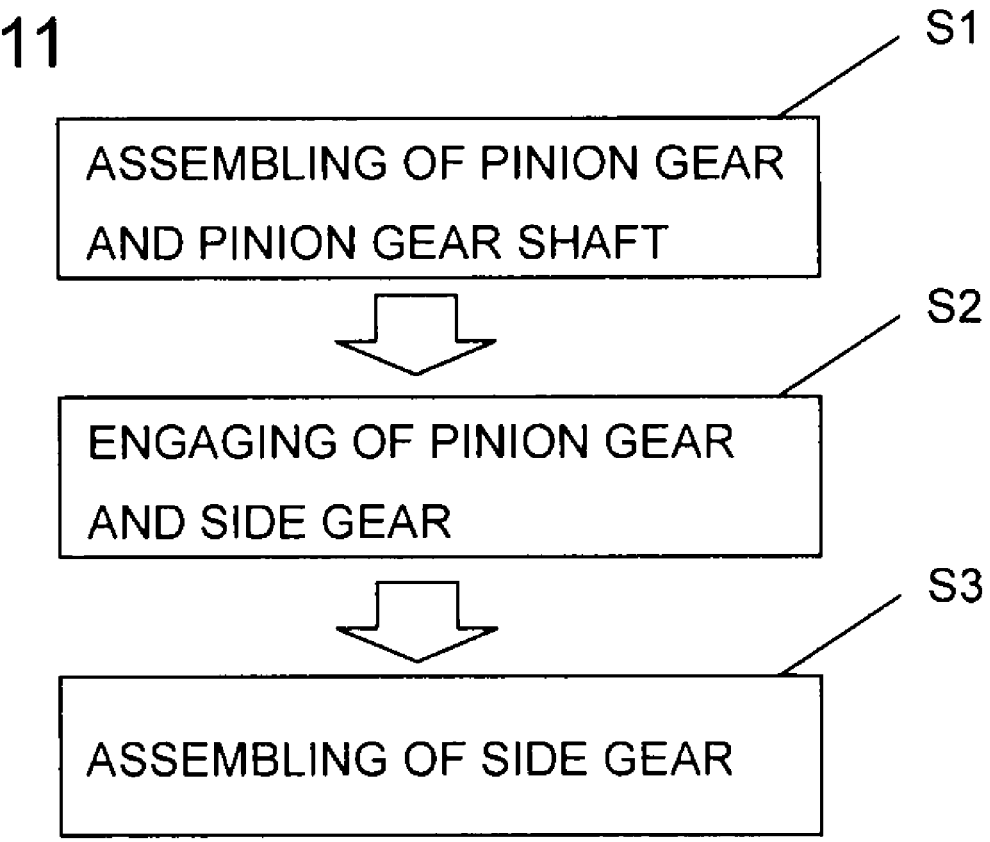
FIG. 11 is a flow chart showing explanations of assembling method of a differential apparatus for a vehicle according to first embodiment of the present invention.

In this occasion, after the pinion gear shaft 50 is fixed to the differential case 2, the pinion gear shaft 50 and the pinion gears 3, 4 are assembled in a state that the pinion gear shaft 50 is inserted into the shaft penetrating holes 3D, 4D and the pinion gears 3, 4 are supported onto the pinion gear shaft 50 slidably and movably along its axes respectively in Step S1 of FIG. 11.

"Engagement of Pinion Gear and Side Gear"

The first sliding surfaces 30B, 40B of the gear collar portions 3B, 4B are faced to the first pinion gear supporting surfaces 10A, 11A of the gear/shaft supporting portions 10, 11 and the second sliding surfaces 30A, 40A of the shaft penetrating holes 3D, 4D of the gear barrel portions 3A, 4A are faced to the second pinion gear supporting surface 50A, 50B of the pinion gear shaft 50. The pinion gears 3, 4 are hold on the pinion gear shaft 50 in a state that the gear portions 3C, 4C are exposed through the opening area of the side gear penetrating openings 12R, 12L. The side gears 5R, 5L are inserted into the differential case 2 through the side gear penetrating openings 12R, 12L along a direction that the gear axes of the side gears 5R, 5L are perpendicular to the gear axes of the pinion gears 3, 4, thereby the gear portions 5Rb, 5Lb of the side gears 5R, 5L are engaged in mesh with the gear portions 3C, 4C of the pinion gears 3, 4 in Step S2 of FIG. 11.

In this case after the gear portions 5Rb, 5Lb of the side gears 5R, 5L are engaged in mesh with the gear portions 3C, 4C of the pinion gears 3, 4, the spherical center of the sliding portions 5Rc, 5Lc of the side gears 5R, 5L are positioned on the rotational axis O of the differential case 2.

"Assemble of Side Gear"

Figure 12A:
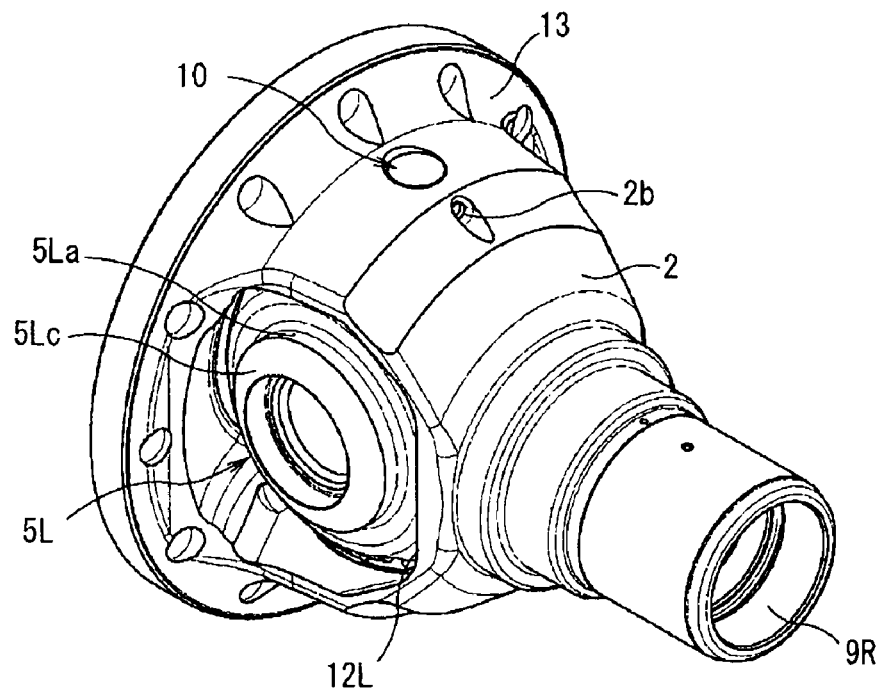
FIG. 12A and FIG. 12B are oblique perspective diagrams explaining an assembling method of a differential apparatus for a vehicle according to first embodiment of the present invention.
Figure 12B:
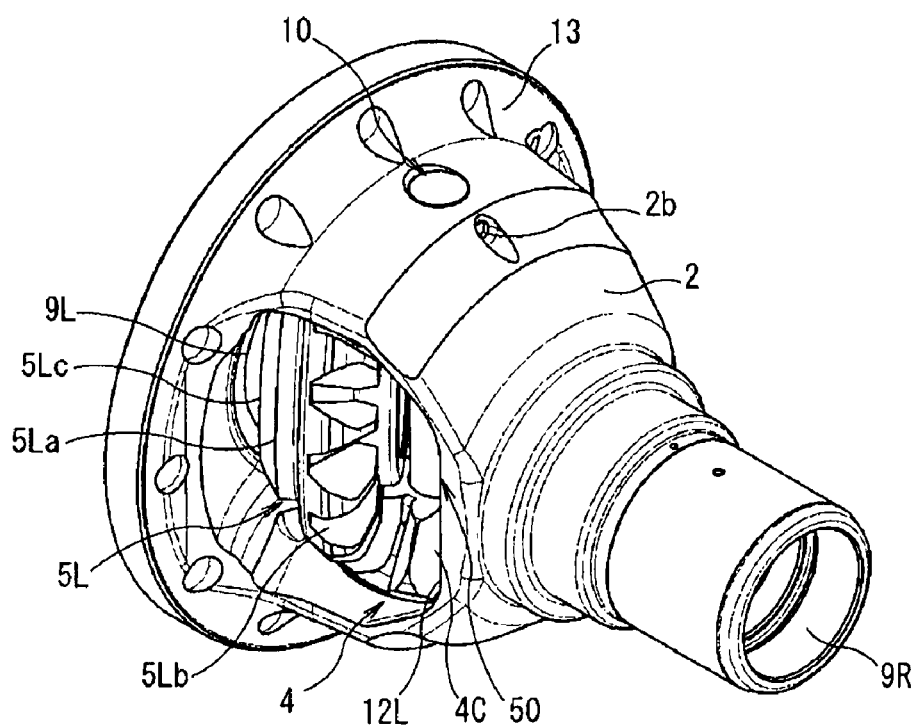
Figure 13A:
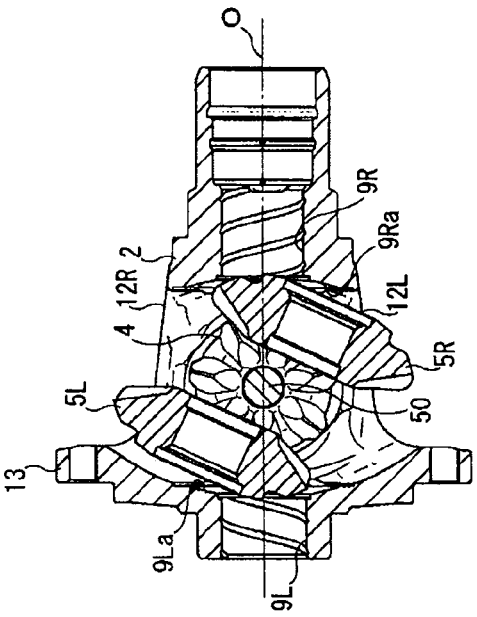
FIG. 13A to FIG. 13D is an oblique perspective diagram explaining a step of "assembling of side gear" of an assembling method of a differential apparatus for a vehicle according to first embodiment of the present invention.
Figure 13B:
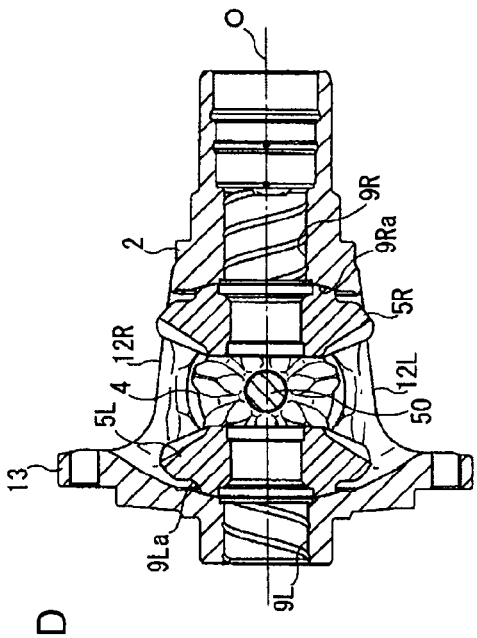
Figure 13C:
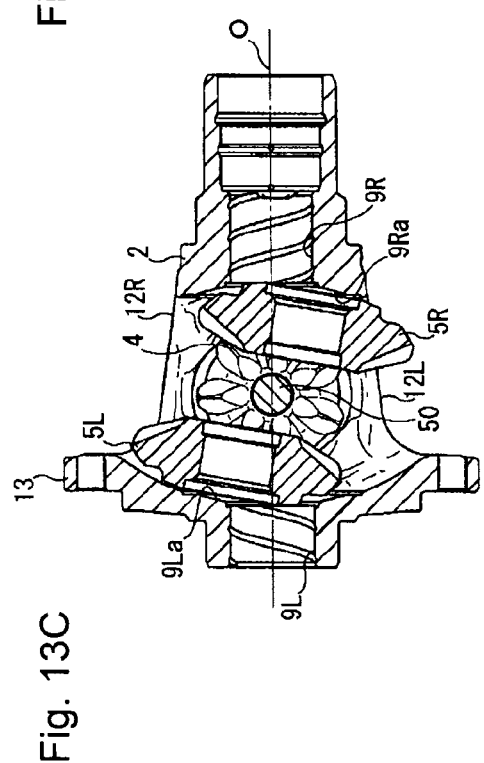
Figure 13D:
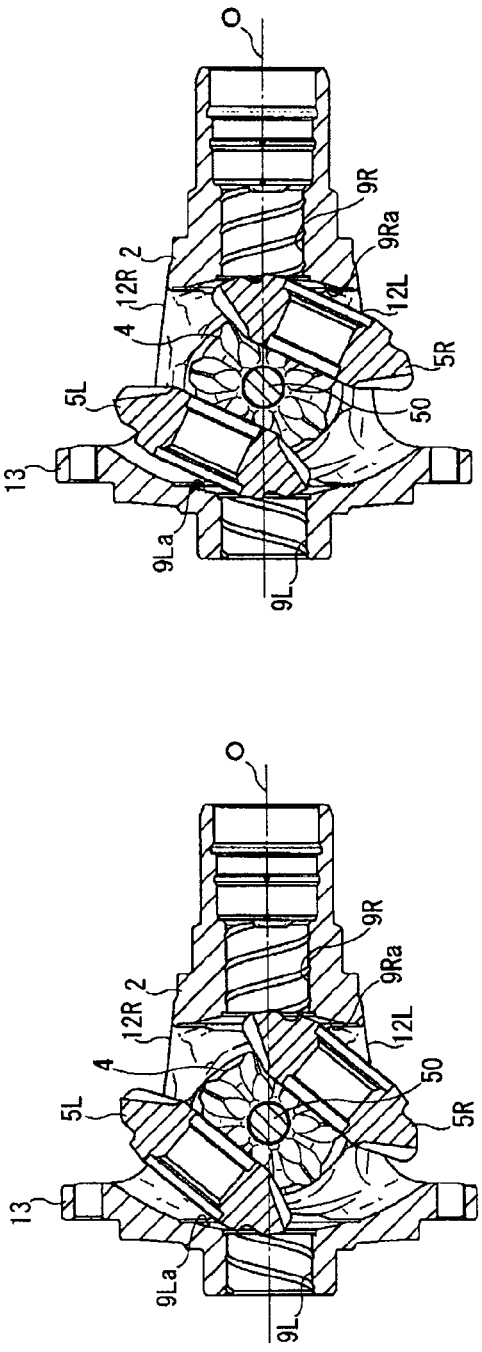

In maintaining the state that the gear portions 5Rb, 5Lb of the side gears 5R, 5L are engaged in mesh with the gear portions 3C, 4C of the pinion gears 3, 4, the side gears 5R, 5L are rotated each other in a same direction of clockwise or counter clockwise around the axes of the pinion gear shaft 50 and the pinion gear shafts 3, 4, thereby the side gears 5R, 5L are positioned at a side gear assembling position of the differential case 2 as shown in FIG. 2 through a side gear inserting position as shown in FIG. 12A and an intermediate position, that is between the side gear inserting position and the side gear assembling position, as shown in FIG. 12B.

In this occasion, each of the rotations of the side gears 5R, 5L near the side gear assembling positions is respectively achieved by sliding the sliding portion 5Lc, 5Rc of back surface of the side gears 5R, 5L on the side gear receiving portion 9Ra, 9La of the inner opened peripheral edge of the tire shaft inserted holes 9R, 9L. Then after the side gears 5R, 5L are positioned at the side gear assembling positions, the sliding portions 5Rc, 5Lc are assembled into the differential case 2 at facing to the side gear receiving portions 9Ra, 9La as shown in Step S3 of FIG. 11.

[All Collected Effects of the First Embodiment]

The first embodiment of the differential apparatus for the vehicle and assembling method thereof according to the present invention achieves next effects.

1. Since the gear portions 3C, 4C of the pinion gears 3, 4 do not include any sliding portion as a supported portion by the differential case 2 like the prior art does, therefore the gear portions 3C, 4C are positioned at the near position to the rotational axis O of the differential case 2 compared to the gear collar portions 3B, 4B are. Thereby, the first embodiment of the differential apparatus for the vehicle of the present invention can execute the stable sliding of the pinion gears 3, 4 sliding the first sliding surfaces 30B, 40B on the first pinion gear supporting portion 10A, 11A of the differential case 2 and can make sufficient large sizes of the engaging area of both gear surfaces of the pinion gears 3, 4 to be able to achieve the high flexibility of setting the higher torque bias ratio.

2. Since the first sliding surfaces 30B, 40B of the pinion gears 3, 4 are supported by the first pinion gear supporting surfaces 10A, 11A of the differential case 2 and the second sliding surfaces 30A, 40A of the pinion gear 3, 4 are supported by the second pinion gear supporting surface 50A, 50B of the pinion gear shaft 50, thereby to restrict the inclination of the pinion gears 3, 4 steadily so that it is possible for the present invention to restrain the generation of seizure or wear concentration of the pinion gears 3, 4 or its supporting surfaces, especially the edge portion of the pinion gears, and also to maintain the good engagement in mesh between the pinion gears 3, 4 and the side gears 5R, 5L.

3. Since the tooth tip diameter D1 of the gear portion 3C, 4C is set to be larger than the outer diameter D of the gear collar portion 3B, 4B and only the first pinion gear supporting surfaces 30B, 40B of the differential case 2 support the gear collar portion 3B, 4B of the pinion gears 3, 4 as explained in the above-identified effect 1, it is possible to set the bigger size of the engaging area of both gear surfaces of the gear portions 3C, 4C of the pinion gears 3, 4 and to widen the engaging area between the gear portions 3C, 4C and the side gears 5R, 5L and thereby to achieve the flexibility of setting the higher torque bias ratio.

4. The tooth number of the gear portion 3C, 4C can be reduced to the number of less than 8, thereby to enforce the bending strength of the pinion gears and make the effect that there is no need to set the bigger whole size of the pinion gears, thereby to restrict to make the whole size of the differential case 2 larger.

5. Since the gear collar portion 3B, 4B perform the function to be reinforcing means for the gear portions 3C, 4C, the stress acted on the pinion gears 3, 4 is scattered by the load from the side gears 5R, 5L and the tooth number of the gear portions 3C, 4C are reduced as explained in the above-identified effect 4, the bending stress of the gear portions 3C, 4C is enforced. Thereby, it is to reduce the position changing of the engagement between the pinion gears 3, 4 and the side gears 5R, 5L, thereby obtaining the stable differential restricting torque.

6. Since there is no any thrust washer to be inserted between the sliding portion 5Rc, 5Lc of the back surfaces of the side gears 5R, 5L and the inner opened peripheral edges of the tire shaft inserted holes 9R, 9L, it is possible for the assembling method of the differential apparatus for the vehicle to reduce work time, thereby simplifying its assembling operation and reducing the assembling cost.

[The Second Embodiment of the Present Invention]

The second embodiment of the differential apparatus for the vehicle and assembling method thereof according to the present invention will be explained in referring to FIG. 14 hereinafter. A numeral in FIG. 14 same to the numeral in FIG. 3 is the same member to be identified by the same numeral and eliminated the explanation in detail.

Figure 14:
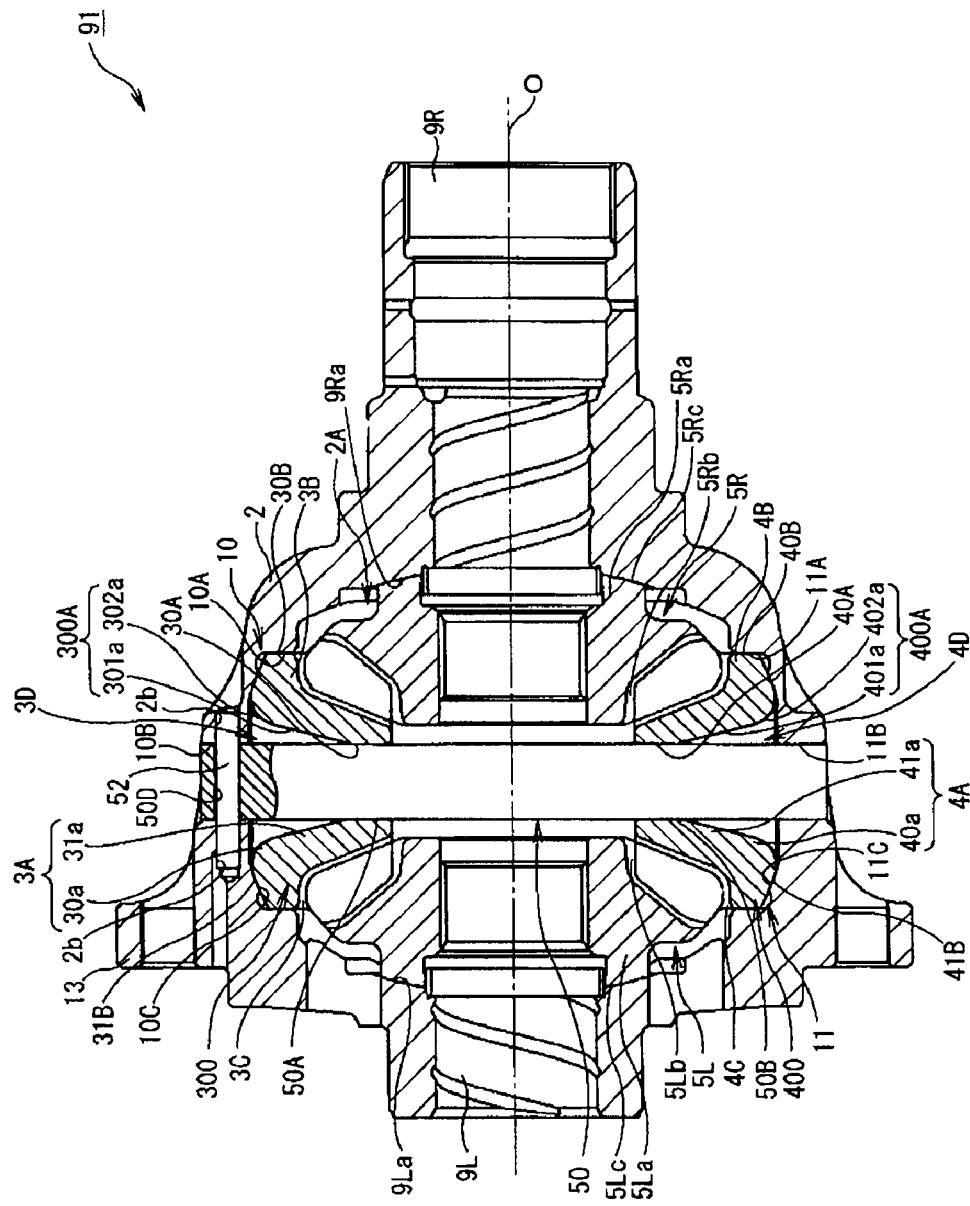
FIG. 14 is a cross sectional drawing explaining a differential apparatus for a vehicle according to second embodiment of the present invention.

As shown in FIG. 14, it is for a feature of the second embodiment to provide pinion gears 300, 400 being removed the end portion in the side of the gear back surface of the inner surface of the shaft penetrating holes 3D, 4D at the both opposite sides of the end edge portion.

For the purpose, the shaft penetrating holes 3D, 4D of the pinion gears 300, 400 has the inner surfaces constructed by the second sliding surfaces 30A, 40A and non-sliding surfaces 300A, 400A that are respectively tapered opening portions like a horn profile widening largely from the gear intermediate portion to the gear back surface.

The non-sliding surfaces 300A, 400A do not slide on the outer surface of the pinion gear shaft 50 and the non-sliding surfaces 300A, 400A include taper surfaces 301a, 401a connecting to the second sliding surfaces 30A, 40A respectively, and smooth curved surfaces 302a, 402a connecting to the taper surfaces 301a, 401a and to the end surface of the back surface of the gear collar portions 3B, 4B respectively.

The assembling method of the second embodiment of the present invention is same to that of the first embodiment of the present invention, thereby to be eliminated to explain the assembling method.

[Effect of the Second Embodiment]

The second embodiment of the differential apparatus for the vehicle and assembling method thereof according to the present invention achieves next effect 7 in addition to the above-identified effects 1 to 6;

7. Since the non-sliding surfaces 300A, 400A are respectively formed by tapered opening portions like the horn profile having the smooth curved surfaces 302a, 402a at the gear openings of the gear back surfaces, stiffness of the pinion gears 3, 4 is uniform to be obtained higher strength of the tooth faces than that of the first embodiment.

Third Embodiment of the Present Invention

The third embodiment of the differential apparatus for the vehicle and assembling method thereof according to the present invention will be explained in referring to FIG. 15 hereinafter. A numeral in FIG. 15 same to the numeral in FIGS. 2 to 7 is the same member to be identified by the same numeral and eliminated the explanation in detail.

Figure 15:
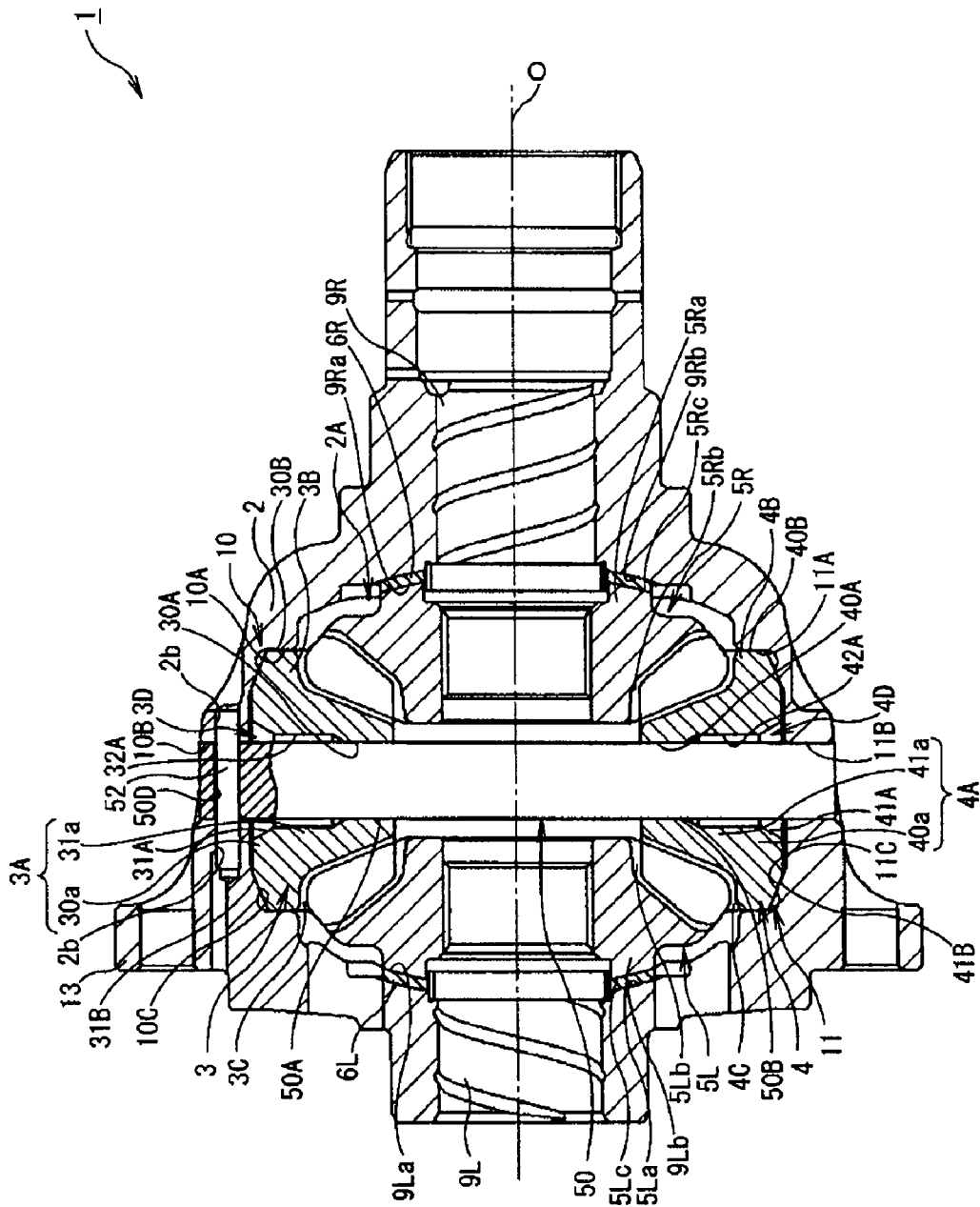
FIG. 15 is a cross sectional drawing explaining a differential apparatus for a vehicle according to third embodiment of the present invention.

As shown in FIG. 15, the feature of the third embodiment of differential apparatus 100 according to the present invention is spherical thrust washers 6R, 6L fitted to the spherical sliding portions 5Rc, 5Lc and inserted between the sliding portions 5Rc, 5Lc of the back surfaces of the side gears 5R, 5L and the inner opening peripheral edges of the tire shaft inserted holes 9R, 9L.

Thereby, on the inner opened peripheral edges of the tire shaft inserted holes 9R, 9L of the differential case 2 are mounted thrust washer receiving portions 9Rb, 9Lb fitted to the spherical thrust washers 6R, 6L instead for the side gear receiving portions 9Ra, 9La.

The assembling method of the third embodiment of the differential apparatus for the vehicle according to the present invention will be explained hereinafter according to FIG. 16.

The assembling method of the differential apparatus for the vehicle according to the third embodiment is performed in order of each step of "assemble of pinion gear and pinion gear shaft" and "assemble of side gear"/"engagement of pinion gear and side gear"/"assemble of spherical thrust washer" so that each step will be explained in order.

Besides, the Step S1, in FIG. 16, of "assemble of pinion gear and pinion gear shaft" in the third embodiment is eliminated its explanation because that is same to the "assemble of pinion gear and pinion gear shaft" in the first embodiment.

"Assemble of Side Gear"

The first sliding surfaces 30B, 40B of the gear collar portions 3B, 4B are faced to the first pinion gear supporting surfaces 10A, 11A of the gear/shaft supporting portions 10, 11 and the second sliding surfaces 30A, 40A of the shaft penetrating holes 3D, 4D of the gear barrel portions 3A, 4A are faced to the second pinion gear supporting surface 50A, 50B of the pinion gear shaft 50. The pinion gears 3, 4 are hold on the pinion gear shaft 50 in a state that the gear portions 3C, 4C are exposed through the opening area of the side gear penetrating openings 12R, 12L. The side gears 5R, 5L are inserted into the differential case 2 through the side gear penetrating openings 12R, 12L along a direction that the gear axes of the side gears 5R, 5L are perpendicular to the gear axes of the pinion gears 3, 4, the side gears 5R, 5L are rotated each other in a same direction of clockwise or counter clockwise around the axes of the pinion gear shaft 50, thereby the side gears 5R, 5L are positioned on the rotational axis O of the differential case 2.

In this occasion, after the side gears 5R, 5L are respectively positioned on the rotational axis O, the side gears 5R, 5L are assembled inside the differential case 2 with facing the sliding portions 5Rc, 5Lc to the thrust washer receiving portions 9Rb, 9Lb of the tire shaft inserted holes 9R, 9L as shown in Step S2 of FIG. 16.

"Engagement of Pinion Gear and Side Gear"

The side gears 5R, 5L are moved to a direction to approach each other along the rotational axis O to engage in mesh the gear portions 5Rb, 5Lb with the gear portions 3C, 4C of the pinion gears 3, 4 in Step S3 of FIG. 16.

In this case after the gear portions 5Rb, 5Lb of the side gears 5R, 5L are engaged in mesh with the gear portions 3C, 4C of the pinion gears 3, 4, a space is formed between the sliding portions 5Rc, 5Lc of the side gears 5R, 5L and the thrust washer receiving portions 9Rb, 9Lb of the differential case 2 along the rotational axis O.

"Assemble of Spherical Thrust Washer"

The spherical thrust washers 6R, 6L are inserted into the differential case 2 through the side gear penetrating openings 12R, 12L to insert the thrust washers 6R, 6L between the sliding portions 5Rc, 5Lc of the side gears 5R, 5L and the thrust washer receiving portions 9Rb, 9Lb of the differential case 2. The spherical thrust washers 6R, 6L are prepared the spherical thrust washers of which thickness corresponds to a dimension or a parts number of the space formed between the sliding portions 5Rc, 5Lc of the side gears 5R, 5L and the thrust washer receiving portions 9Rb, 9Lb of the differential case 2.

In this occasion, after the spherical thrust washers 6R, 6L are inserted between the side gears 5R, 5L and the thrust washer receiving portions 9Rb, 9Lb, the spherical thrust washers 6R, 6L are assembled inside the differential case 2 as shown in Step S4 of FIG. 16.

[Effect of the Third Embodiment]

The third embodiment of the differential apparatus for the vehicle and assembling method thereof according to the present invention achieves next effect 8 in adding to the above-identified effects 1 to 5;

8. Since the spherical thrust washers 6R, 6L having its thickness corresponding to the space between the side gears 5R, 5L and the thrust washer receiving portions 9Rb, 9Lb can be inserted between the side gears 5R, 5L and the thrust washer receiving portions 9Rb, 9Lb, any assembling error along the rotational axis O in the differential case 2 is absorbed.

While the invention has been described in detail with reference to the preferred embodiment, it will be apparent to those skilled in the art that the invention is not limited to the present embodiments, and that the invention may be realized in various other embodiments within the scope of the claims. For example, next items are possible for other embodiments.

1. While each of the embodiments of the present invention is described that the gear collar portions 3B, 4B are the annular circular bodies having a uniform diameter along the gear axes respectively, the invention is not limited to the construction but it may be constructed as the gear collar portions being the annular circular bodies having a different outer diameter along its axial direction, that is a taper surface of its outer surface. In other words, the collar portions of the present invention should be the annular circular bodies having each uniform thickness around the peripheral direction along the axial direction. In this case, the first pinion gear supporting portions fitting to the first sliding surfaces of the outer surfaces of the gear collar portions are provided.

While each of the embodiments of the present invention is described that each of the gear tooth numbers of the gear portions 3C, 4C is seven, the invention is not limited to the construction but it may be constructed by six or eight to achieve the same effects.

3. While each of the embodiments of the present invention is described that the plural pinion gears 3, 4 installed in the differential case 2 is two pinion gears, the invention is not limited to the construction but it may be constructed by more than three pinion gears in the differential case 2 by the way of smaller diameter of the pinion gear.

4. While each of the embodiments of the present invention is described that the inner diameter of the shaft penetrating holes 3D, 4D of the pinion gears 3, 4 is the smaller diameter at the second sliding surfaces 30A, 40A than at the non-sliding surface 32A, 42A, the invention is not limited to the construction but it may be constructed that the inner diameter of the shaft penetrating holes 3D, 4D of the pinion gears 3, 4 is set the same diameter at the second sliding surfaces 30A, 40A and the non-sliding surface 32A, 42A in a condition that only the second sliding surfaces 30A, 40A slides on second pinion gear supporting 50A, 50B of the pinion gear shaft 50. In this occasion, the pinion gear shaft 50 has a larger diameter portion at a position facing to the second sliding surfaces 30A, 40A than at other positions in the shaft penetrating holes 3D, 4D.

5. While each of the embodiments of the present invention is described that the differential case 2 is constructed as one piece member, the invention is not limited to the construction but it may be constructed with a plurality of elements.

6. While each of the embodiments of the present invention is described that the differential apparatus 1 for the vehicle includes the pinion gear shaft 50, the invention is not limited to the construction but it may be the shaft-less type differential apparatus for the vehicle having no pinion gear shaft if the pinion gears are supported without its inclination.

What is claimed is:

1. A differential apparatus for a vehicle comprising:
a differential case;
one pair of side gears rotatably accommodated in said differential case; and
at least one pair of pinion gears engaging with said one pair of side gears, where an axis of said pinion gear is perpendicular to an axis of said side gear respectively, each of said at least one pair of pinion gears includes a gear barrel portion having a center line in coincidence with said gear axis of said pinion gear, a gear portion having teeth and that engages said side gears at an engaging portion, said gear portion being formed at an outer peripheral side of said gear barrel portion, and a gear collar portion formed at an entire peripheral portion of a gear back surface and formed in one body with said gear barrel portion;
said differential case having at least one pair of pinion gear supporting portions rotatably supporting said at least one pair of pinion gears by an outer peripheral surface of said collar portion, each of said pinion gears sliding on one of said pinion gear supporting portions, and
wherein said gear portion is axially separated from said gear collar portion along the gear axis of each of said pinion gears such that said gear portion is positioned to the rotational axis of the differential case than is the gear collar portion,
wherein no portion of said gear portion is supported by said pinion gear supporting portions, and
wherein the diameter of the outer peripheral surface of said gear collar portion is greater than a diameter of a tooth root of the gear teeth at the radially outermost point of the gear portion along the gear axis.

2. A differential apparatus for a vehicle according to claim 1, wherein a diameter of a tooth tip of each said gear portion is larger than the diameter of the outer peripheral surface of said gear collar portion.

3. A differential apparatus for a vehicle according to claim 1, wherein a tooth number N of each of the engaging portions is $6 \leqq N \leqq 8$.

4. A differential apparatus for a vehicle according to claim 1, further comprising:
a pinion gear shaft supported by said differential case, each of said at least one pair of pinion gears includes a shaft penetrating hole at a center axis portion, and said pinion gear shaft penetrates through said shaft penetrating hole.

5. A differential apparatus for a vehicle according to claim 4, wherein said gear collar portion is an annular circular body having a uniform thickness around a peripheral direction along an axial direction.

6. A differential apparatus for a vehicle according to claim 5, wherein said gear collar portion is said annular circular body having a uniform diameter along said axial direction.

7. A differential apparatus for a vehicle according to claim 4, wherein:
each of said one pair of side gears includes a sliding portion comprising a spherical surface sliding on an inner surface of said differential case at a back surface side, and
a center of said spherical surface of said sliding portion is positioned on a rotational axis of said differential case.

8. A differential apparatus for a vehicle according to claim 4, wherein a diameter of a tooth tip of each said gear portion engaging with said one pair of side gears is larger than an outer diameter of said gear collar portion.

9. A differential apparatus for a vehicle according to claim 4, wherein a tooth number N of each of the engaging portions of is $6 \leq N \leq 8$.

10. A differential apparatus for a vehicle according to claim 4, wherein:
said differential case includes a first pinion gear supporting portion rotatably supporting said at least one pair of pinion gears by said outer peripheral surface of said gear collar portion sliding on the first pinion gear supporting portion;
said pinion gear shaft includes a second pinion gear supporting portion rotatably supporting said at least one pair of pinion gears by an inner surface of said shaft penetrating hole sliding on said second pinion gear supporting portion; and
said second pinion gear supporting portion is positioned nearer to said rotational axis of said differential case than is said first pinion gear supporting portion.

11. A differential apparatus for a vehicle according to claim 10, wherein a diameter of a tooth tip of each said gear portion engaging with said one pair of side gears is larger than an outer diameter of said gear collar portion.

12. A differential apparatus for a vehicle according to claim 10, wherein a tooth number N of each of the engaging portions is $6 \leq N \leq 8$.

13. A differential apparatus for a vehicle according to claim 10, wherein:
said first pinion gear supporting portion is positioned farther from said rotational axis of said differential case than is an engagement center of said at least one pair of pinion gears with said one pair of side gears along an axial direction of said pinion gear shaft; and
said second pinion gear supporting portion is positioned nearer to said rotational axis of said differential case than is an engagement center of said at least one pair of pinion gears with said one pair of side gears along the axial direction of said pinion gear shaft.

14. A differential apparatus for a vehicle according to claim 10, wherein said first pinion gear supporting portion and said second pinion gear supporting portion are positioned with a predetermined distance relative to each other along said axial direction of said pinion gear shaft.

15. A differential apparatus for a vehicle according to claim 10, wherein:
said shaft penetrating hole is formed as a stepped hole having respective inner surfaces of a large inner diameter and a small inner diameter, and
said inner surface of said small inner diameter slides on said second pinion gear supporting portion.

16. A differential apparatus for a vehicle according to claim 10, wherein said shaft penetrating hole is formed as a tapered hole widening to said gear back surface.

17. A differential apparatus for a vehicle according to claim 10, wherein said second pinion gear supporting portion of said pinion gear shaft has a larger diameter than the other portions of said pinion gear shaft in said shaft penetrating hole to slide only said second pinion gear supporting portion on an inner surface of said shaft penetrating hole.

18. A differential apparatus for a vehicle according to claim 10, wherein said pinion gear shaft is non-rotatably supported around its axis by said differential case.

19. A differential apparatus for a vehicle according to claim 10, wherein a thickness of said gear collar portion is approximately equal to a thickness of said gear barrel portion at an end portion of said gear back surface.

20. A differential apparatus for a vehicle according to claim 10, wherein each of said shaft penetrating holes of said at least one pair of pinion gears includes a curved surface at an opened inner surface of said gear back surface.

21. A differential apparatus for a vehicle comprising:
a differential case;
one pair of side gears rotatably accommodated in said differential case;
at least one pair of pinion gears engaging with said one pair of side gears, where an axis of said pinion gear is perpendicular to an axis of said side gear respectively, each of said at least one pair of pinion gears includes a gear barrel portion having a shaft penetrating hole in its center axis portion, a gear portion having teeth and that engages said side gears at an engaging portion, said gear portion being formed at an outer peripheral side of said gear barrel portion, and a gear collar portion formed in one body with said gear barrel portion; and
a pinion gear shaft penetrating through said shaft penetrating hole and supported by said differential case;
said differential case having at least one pair of pinion gear supporting portions rotatably supporting said at least one pair of pinion gears by an outer peripheral surface of said collar portion, each of said pinion gears sliding on one of said pinion gear supporting portions, and
wherein said gear portion is axially separated from said gear collar portion along the gear axis of each of said pinion gears such that said gear portion is positioned to the rotational axis of the differential case than is the gear collar portion,
wherein no portion of said gear portion is supported by said pinion gear supporting portions, and
wherein the diameter of the outer peripheral surface of said gear collar portion is greater than a diameter of a tooth root of the gear teeth at the radially outermost point of the gear portion along the gear axis.

22. A differential apparatus for a vehicle comprising:
a differential case;
one pair of side gears rotatably accommodated in said differential case;
at least one pair of pinion gears engaging with said one pair of side gears, where an axis of said pinion gear is perpendicular to an axis of said side gear respectively, each of said at least one pair of pinion gears includes a gear barrel portion having a shaft penetrating hole in its center axis portion, a gear portion formed at an outer peripheral side of said gear barrel portion and having teeth that engage said side gears at an engaging portion, and a gear collar portion formed in one body with said gear barrel portion; and a pinion gear shaft penetrating through said shaft penetrating hole and supported by said differential case; wherein a diameter of a tooth tip of each said gear portion is larger than an outer diameter of said gear collar portion, and wherein the diameter of the outer peripheral surface of said gear collar portion is greater than a diameter of a tooth root of the gear teeth at the radially outermost point of the gear portion along the gear axis.

23. A differential apparatus for a vehicle comprising:

a differential case;

one pair of side gears rotatably accommodated in said differential case;

at least one pair of pinion gears engaging with said one pair of side gears, where an axis of said pinion gear is perpendicular to an axis of said side gear respectively, each of said at least one pair of pinion gears includes a gear barrel portion having a shaft penetrating hole in its center axis portion, a gear portion formed at an outer peripheral side of said gear barrel portion and having teeth and that engages said side gears at an engaging portion, and a gear collar portion formed in one body with said gear barrel portion; and a pinion gear shaft penetrating through said shaft penetrating hole and supported by said differential case;

wherein a tooth number N of each of engaging portions of said at least one pair of pinion gears with said one pair of side gears is set under condition of $6 \leqq N \leqq 8$, and wherein the diameter of the outer peripheral surface of said gear collar portion is greater than a diameter of a tooth root of the gear teeth at the radially outermost point of the gear portion along the gear axis.

24. A differential apparatus for a vehicle comprising:

a differential case;

one pair of side gears rotatably accommodated in said differential case; at least one pair of pinion gears engaging with said one pair of side gears, where an axis of said pinion gear is perpendicular to an axis of said side gear respectively, each of said at least one pair of pinion gears includes a gear barrel portion having a shaft penetrating hole in its center axis portion, a gear portion formed at an outer peripheral side of said gear barrel portion and having teeth and that engages said side gears at an engaging portion, and a gear collar portion formed in one body with said gear barrel portion; and a pinion gear shaft penetrating through said shaft penetrating hole and supported by said differential case;

said differential case includes a first pinion gear supporting portion rotatably supporting said at least one pair of pinion gears by said outer peripheral surface of said gear collar portion, each of said pinion gears sliding on one of said pinion gear supporting portions;

said pinion gear shaft includes a second pinion gear supporting portion rotatably supporting said at least one pair of pinion gears by an inner surface of said shaft penetrating hole sliding on said second pinion gear supporting portion; and said second pinion gear supporting portion is positioned nearer to said rotational axis of said differential case than is the first pinion gear supporting portion, wherein the diameter of the outer peripheral surface of said gear collar portion is greater than a diameter of a tooth root of the gear teeth at the radially outermost point of the gear portion along the gear axis.

\* \* \* \* \*